US010356825B2

(12) United States Patent
Aminaka et al.

(10) Patent No.: US 10,356,825 B2
(45) **Date of Patent: *Jul. 16, 2019**

(54) USER EQUIPMENT AND METHOD FOR RESOURCE ALLOCATION

(71) Applicant: NEC Corporation, Tokyo (JP)

(72) Inventors: Hiroaki Aminaka, Tokyo (JP); Kojiro Hamabe, Tokyo (JP); Jinsock Lee, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/150,579

(22) Filed: Oct. 3, 2018

(65) Prior Publication Data

US 2019/0037610 A1 Jan. 31, 2019

Related U.S. Application Data

(63) Continuation of application No. 15/709,926, filed on Sep. 20, 2017, now Pat. No. 10,123,357, which is a (Continued)

(30) Foreign Application Priority Data

Dec. 28, 2007 (JP) ................................ 2007-339270

(51) Int. Cl.
*H04W 74/08* (2009.01)
*H04B 1/707* (2011.01)
(Continued)

(52) U.S. Cl.
CPC .......... *H04W 74/0866* (2013.01); *H04B 1/04* (2013.01); *H04B 1/16* (2013.01); (Continued)

(58) Field of Classification Search
CPC ................................................ H04W 74/0866
(Continued)

(56) References Cited

U.S. PATENT DOCUMENTS 6,925,561 B1 8/2005 Hunt et al.
7,406,044 B2 7/2008 Cave et al.
(Continued)

FOREIGN PATENT DOCUMENTS

CN 1342379 3/2002
CN 1685743 10/2005
(Continued)

OTHER PUBLICATIONS

International Search Report, PCT/JP2008/068159, dated Jan. 13, 2009.

(Continued)

*Primary Examiner* — Angel T Brockman
(74) *Attorney, Agent, or Firm* — Young & Thompson

(57) ABSTRACT

To solve a problem that unless all of a plurality of AICH signature states are correctly decoded, the contents of reception results cannot be recognized and the error rate of signature decoding will be high. In this embodiment, a base station uses, out of a signature combination, the signature of at least one predetermined position to indicate information containing a preamble reception result and uses the signature of a position other than the predetermined position to indicate a transmission profile information number of an uplink channel for notification to a user equipment. Thus, the error rate related to reception results can be reduced as compared with the case where a single signature combination is used to notify all pieces of information.

24 Claims, 9 Drawing Sheets

USER EQUIPMENT 20
RECEPTION RESULT PROCESSING UNIT 203
RECEPTION PROCESSING UNIT 202
RADIO COMMUNICATION UNIT 201
E-DCH TRANSMISSION PROFILE INFORMATION HOLDING UNIT 205
TRANSMISSION DATA CONTROL UNIT 204
BUFFER 207
TRANSMISSION PROCESSING UNIT 206

Related U.S. Application Data continuation of application No. 15/094,161, filed on Apr. 8, 2016, now Pat. No. 9,801,212, which is a continuation of application No. 12/746,926, filed as application No. PCT/JP2008/068159 on Oct. 6, 2008, now Pat. No. 9,344,212.

(51) Int. Cl.

| | |
|---|---|
| ***H04J 13/00*** | (2011.01) |
| ***H04J 13/16*** | (2011.01) |
| ***H04B 1/04*** | (2006.01) |
| ***H04B 1/16*** | (2006.01) |
| ***H04L 1/16*** | (2006.01) |
| *H04W 52/48* | (2009.01) |

(52) U.S. Cl.
CPC .......... *H04B 1/707* (2013.01); *H04J 13/0077* (2013.01); *H04J 13/16* (2013.01); *H04L 1/1692* (2013.01); *H04W 52/48* (2013.01)

(58) Field of Classification Search
USPC .......................................................... 370/328
See application file for complete search history.

(56) References Cited

U.S. PATENT DOCUMENTS

| | | | | |
|---|---|---|---|---|
| RE42,452 | E | 6/2011 | Halton et al. | |
| 7,961,669 | B1 * | 6/2011 | Fitton .................... | H04B 1/707 370/328 |
| 8,194,618 | B2 | 6/2012 | Iochi et al. | |
| 9,801,212 | B2 | 10/2017 | Aminaka | |
| 2004/0116126 | A1 | 6/2004 | Cave et al. | |
| 2005/0030919 | A1 | 2/2005 | Lucidarme | |
| 2005/0232158 | A1 | 10/2005 | Hondo | |
| 2005/0238053 | A1 | 10/2005 | Iochi et al. | |
| 2005/0243762 | A1 | 11/2005 | Terry | |
| 2005/0249162 | A1 | 11/2005 | Kim | |
| 2005/0271000 | A1 | 12/2005 | Schulist | |
| 2006/0285504 | A1 | 12/2006 | Dong et al. | |
| 2007/0298824 | A1 | 12/2007 | Ostman et al. | |
| 2008/0259900 | A1 | 10/2008 | Masuda | |
| 2009/0028065 | A1 | 1/2009 | Iwai et al. | |

FOREIGN PATENT DOCUMENTS

| | | |
|---|---|---|
| CN | 1788518 | 6/2006 |
| EP | 1505847 | 2/2005 |
| JP | 2003-513573 | 4/2003 |
| JP | 2004-343258 | 12/2004 |
| JP | 2006-501720 | 1/2006 |

OTHER PUBLICATIONS

3GPP TS 25.214 V7.5.0 (May 2007) 3rd Generation Partnership Project; Technical Specification Group Radio Access NEtwork; Physical layer procedures (FDD).

3GPP TS 25.321 V7.2.0 (Sep. 2006) 3rd Generation Partnership Project; Technical Specification Group Radio Access Network; Medium Access Control (MAC) protocol specification (Release 7).

3GPP TS 25.331 V7.3.0 (Dec. 2006) Release 7.

3GPP TS 25.211 V7.3.0 (Sep. 2007) 3rd Generation Partnership Project; Technical Specification Group Radio Access Network; Physical channels and mapping of transport channels onto physicla channels (FDD) (Release 7).

TSG-RAN #37 Meeting, Riga, Latvia Sep. 11-14, 2007, Enhanced Uplink for CELL_FACH State in FDD, RP-070677.

3GPP TS 25.319 v7.3.0 (Sep. 2007), 3rd Generation Partnership Project; Technical Specification Group Radio Access Network; Enhanced uplink; Overall description; Stage 2 (Release 7).

3GPP TSG-RAN WG2 Meeting #60 Jeju, Korea Nov. 5-9, 2007, “Resource assignment for E-DCH access in CELL_FACH state” R2-074626.

Chinese Official Action—200880123202.8—dated Aug. 27, 2012.

Japanese Official Action—2009-547941—dated Apr. 9, 2013.

Nokia, Nokia Siemens Network, Resource assignment for E-DCH access in CELL_FACH state, 3GPP TSG-RAN WG1 Meeting #50-BIS R1-074303, 8-Enhanced Uplink for CELL_FACH state in FDD, Oct. 8-12, 2007, pp. 1-5.

Extended European Search Report dated Dec. 5, 2013; Application No. 08867814.9.

“3rd Generation Partnership Project; Technical Specification Group Radio Access Network; Physical channels and mapping of transport channels onto physical channels (FDD) (Release 7)”, 3GPP Standard; 3GPP TS 25.211, 3rd Generation Partnership Project (3GPP), Mobile Competence Centre; 650, Route Des Lucioles; F-06921 Sophia-Antipolis Cedex; France, No. V7.4.0, Nov. 1, 2007, pp. 1-54, XP050366707.

* cited by examiner

START
TRANSMISSION DATA IS GENERATED
S301
M = Minit
S302
TRANSMIT PREAMBLE
S303
RECEPTION RESULT FROM BASE STATION?
S304
NACK
ACK
No ACK
M = 0?
S305
N
M = M − 1
S308
Y
END
TRANSMIT UPLINK DATA BY USING ALLOCATED E-DCH TRANSMISSION PROFILE
S307
END
M = 0?
S306
END
M = M − 1
S309

USER EQUIPMENT AND METHOD FOR RESOURCE ALLOCATION

TECHNICAL FIELD

The present invention relates to a response notifying method and a relevant technique.

BACKGROUND ART

Inr W-CDMA (Wideband Code Division Multiple Access), which is the third-generation mobile communication system, a user equipment (UE) in a CELL_FACH (Forward Access Channel) state does not specify a base station to which it belongs but selects a base station to which it belongs each time it transmits control information or the like. An operation of a RACH (Random Access Channel), which is an uplink data channel, is defined in the specification of the third-generation mobile communication system standardization project 3GPP (3rd Generation Partnership Project) (cf. e.g. Non Patent Documents 1 to 4). Further, in 3GPP Release 8, an E-RACH (Enhanced RACH) is being studied as an enhanced technique of the RACH (cf. e.g. Non Patent Document 5). An operation of the E-RACH is briefly described hereinafter with reference to FIGS. 1 to 3.

FIG. 1 is a block diagram showing a configuration of a mobile communication system. In order to avoid complicated description, it is assumed that a plurality of user equipments 20-1, 20-2, 20-3 and 20-N are located within a cell of a base station 10, and the user equipments are in the CELL_FACH state. It is also assumed that the base station 10 is connected to a host network device 30. Note that a given user equipment is referred to as "user equipment 20".

FIG. 2 is a diagram showing an operation of the E-RACH, and FIG. 3 is a sequence chart of channel setting such as the E-RACH. Referring to FIG. 2, uplink communication involves an uplink data channel E-DCH (Enhanced Dedicated Channel) and a preamble part for providing timing before transmitting the E-DCH. Downlink communication involves a downlink channel AICH (Acquisition Indicator Channel) for responding to the preamble part received from the user equipment.

In the preamble part, a preamble signature Csig,s and a spread code called a preamble scrambling code Sr-pre,n, which are described later, are used. The preamble signature Csig,s consists of 4096 chips, which is a sequence of 256 repetitions of Hadamard codes with a code length of 16, and the preamble scrambling code Sr-pre,n is a cell identification code that is notified from the base station. The preamble signature Csig,s is randomly selected from predetermined preamble signatures (Csig,1, Csig,2, . . . Csig,s) by each user equipment.

Code data Cpre,n,s of the preamble part consists of the corresponding k-th preamble signature Csig,s among the 4096 chips and the preamble scrambling code Sr-pre,n as represented by the following mathematical expression (1).

[Expression 1]

$$C_{pre,n,s}(k) = S_{r-pre,n}(k) \times C_{sig,s}(k) \times e^{j\left(\frac{\pi}{4}+\frac{\pi}{2}k\right)} \quad (1)$$

k=0, 1, 2, 3, . . . , 4095
Cpre,n,s: Preamble part code data
Sr-pre,n: Preamble scrambling code
Csig,s: Preamble signature The uplink data channel E-DCH is constructed on the basis of the specification defined in 3GPP Release 6 (cf. e.g. Non Patent Document 6).

As shown in FIGS. 2 and 3, the user equipment 20 first transmits preamble part code data with an initial transmission power value that is calculated from a reception electric power of a pilot channel of the base station 10 to the base station. The preamble part code data is generated by using the preamble scrambling code that is notified from the base station 10 and the preamble signature that is randomly selected by its own equipment as described above. For the received preamble, the base station 10 transmits a reception result (ACK/NACK/NoACK) to the user equipment 20 by using a plurality of AICH signature states. The AICH signature state is a code corresponding to the contents of notification. The base station 10 transmits a response to the preamble signature that is transmitted from the user equipment 20 to the user equipment at the same time. For the ACK response, an E-DCH transmission profile information number indicating E-DCH transmission profile information, which is described later, is also transmitted to the user equipment at the same time.

For example, a reception result "ACK" is notified when allowing transmission of uplink data with use of the E-DCH for the user equipment that has selected the preamble signature that is used in the preamble which is successfully received by the base station 10, and "NACK" is notified when not allowing it. Further, for the preamble signature that is not used in the preamble which is successfully received, "NoACK" is set as a response in the AICH.

The user equipment 20 receives the reception result through the AICH, and if a response to the preamble signature that is used in preamble transmission is ACK, it determines E-DCH transmission profile information by the below-described method and transmits data to the base station 10. If a response to the preamble signature that is used in preamble transmission is NACK, it performs preamble transmission again after a predetermined period of time. If a response to the preamble signature that is used in preamble transmission is NoACK, the user equipment 20 determines that the base station 10 does not receive the previously transmitted preamble and, if the number of times of retransmission does not reach the upper limit, it increases the transmission power of the preamble by a predetermined amount and carries out retransmission. Note that a minimum retransmission interval τp-p,min of the preamble part and an interval τp-a between the preamble part and the transmission of a reception result in the AICH are respectively determined in advance as shown in FIG. 2. The AICH transmits a reception result (ACK/NACK/NoACK) using a plurality of AICH signature states so as to correspond to the preamble signature Csig,s of the preamble.

The AICH is constructed by combining 32 codes aj derived from the following mathematical expression (2), and signature patterns bs,j of the AICH are defined in the table 1 (cf. e.g. Non Patent Document 4). Here, s indicates a signature number, and bs,j can be 16 patterns. Further, AIs indicates a signature state, and it is transmitted in the AICH as AIs=+1 when a preamble reception result is ACK, AIs=−1 when it is NACK, and AIs=0 when it is NoACK.

[Expression 2]

$$a_j = \sum_{s=0}^{15} AI_s b_{s,j} \quad (2)$$

TABLE 1

| s | $b_{s,0}, b_{s,1} \ldots, b_{s,31}$ | | | | | | | | | | | | | | |
|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 |
| 1 | 1 | 1 | −1 | −1 | 1 | 1 | −1 | −1 | 1 | 1 | −1 | −1 | 1 | 1 | −1 |
| 2 | 1 | 1 | 1 | 1 | −1 | −1 | −1 | −1 | 1 | 1 | 1 | 1 | −1 | −1 | −1 |
| 3 | 1 | 1 | −1 | −1 | −1 | −1 | 1 | 1 | 1 | 1 | −1 | −1 | −1 | −1 | 1 |
| 4 | 1 | 1 | 1 | 1 | 1 | 1 | 1 | 1 | −1 | −1 | −1 | −1 | −1 | −1 | −1 |
| 5 | 1 | 1 | −1 | −1 | 1 | 1 | −1 | −1 | −1 | −1 | 1 | 1 | −1 | −1 | 1 |
| 6 | 1 | 1 | 1 | 1 | −1 | −1 | −1 | −1 | −1 | −1 | −1 | −1 | 1 | 1 | 1 |
| 7 | 1 | 1 | −1 | −1 | −1 | −1 | 1 | 1 | −1 | −1 | 1 | 1 | 1 | 1 | −1 |
| 8 | 1 | 1 | 1 | 1 | 1 | 1 | 1 | 1 | 1 | 1 | 1 | 1 | 1 | 1 | 1 |
| 9 | 1 | 1 | −1 | −1 | 1 | 1 | −1 | −1 | 1 | 1 | −1 | −1 | 1 | 1 | −1 |
| 10 | 1 | 1 | 1 | 1 | −1 | −1 | −1 | −1 | 1 | 1 | 1 | 1 | −1 | −1 | −1 |
| 11 | 1 | 1 | −1 | −1 | −1 | −1 | 1 | 1 | 1 | 1 | −1 | −1 | −1 | −1 | 1 |
| 12 | 1 | 1 | 1 | 1 | 1 | 1 | 1 | 1 | −1 | −1 | −1 | −1 | −1 | −1 | −1 |
| 13 | 1 | 1 | −1 | −1 | 1 | 1 | −1 | −1 | −1 | −1 | 1 | 1 | −1 | −1 | 1 |
| 14 | 1 | 1 | 1 | 1 | −1 | −1 | −1 | −1 | −1 | −1 | −1 | −1 | 1 | 1 | 1 |
| 15 | 1 | 1 | −1 | −1 | −1 | −1 | 1 | 1 | −1 | −1 | 1 | 1 | 1 | 1 | −1 |

| s | $b_{s,0}, b_{s,1} \ldots, b_{s,31}$ | | | | | | | | | | | | | | | | |
|---|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 | 1 |
| 1 | −1 | 1 | 1 | −1 | −1 | 1 | 1 | −1 | −1 | 1 | 1 | −1 | −1 | 1 | 1 | −1 | −1 |
| 2 | −1 | 1 | 1 | 1 | 1 | −1 | −1 | −1 | −1 | 1 | 1 | 1 | 1 | −1 | −1 | −1 | −1 |
| 3 | 1 | 1 | 1 | −1 | −1 | −1 | −1 | 1 | 1 | 1 | 1 | −1 | −1 | −1 | −1 | 1 | 1 |
| 4 | −1 | 1 | 1 | 1 | 1 | 1 | 1 | 1 | 1 | −1 | −1 | −1 | −1 | −1 | −1 | −1 | −1 |
| 5 | 1 | 1 | 1 | −1 | −1 | 1 | 1 | −1 | −1 | −1 | −1 | 1 | 1 | −1 | −1 | 1 | 1 |
| 6 | 1 | 1 | 1 | 1 | 1 | −1 | −1 | −1 | −1 | −1 | −1 | −1 | −1 | 1 | 1 | 1 | 1 |
| 7 | −1 | 1 | 1 | −1 | −1 | −1 | −1 | 1 | 1 | −1 | −1 | 1 | 1 | 1 | 1 | −1 | −1 |
| 8 | 1 | −1 | −1 | −1 | −1 | −1 | −1 | −1 | −1 | −1 | −1 | −1 | −1 | −1 | −1 | −1 | −1 |
| 9 | −1 | −1 | −1 | 1 | 1 | −1 | −1 | 1 | 1 | −1 | −1 | 1 | 1 | −1 | −1 | 1 | 1 |
| 10 | −1 | −1 | −1 | −1 | −1 | 1 | 1 | 1 | 1 | −1 | −1 | −1 | −1 | 1 | 1 | 1 | 1 |
| 11 | 1 | −1 | −1 | 1 | 1 | 1 | 1 | −1 | −1 | −1 | −1 | 1 | 1 | 1 | 1 | −1 | −1 |
| 12 | −1 | −1 | −1 | −1 | −1 | −1 | −1 | −1 | −1 | 1 | 1 | 1 | 1 | 1 | 1 | 1 | 1 |
| 13 | 1 | −1 | −1 | 1 | 1 | −1 | −1 | 1 | 1 | 1 | 1 | −1 | −1 | 1 | 1 | −1 | −1 |
| 14 | 1 | −1 | −1 | −1 | −1 | 1 | 1 | 1 | 1 | 1 | 1 | 1 | 1 | −1 | −1 | −1 | −1 |
| 15 | −1 | −1 | −1 | 1 | 1 | 1 | 1 | −1 | −1 | 1 | 1 | −1 | −1 | −1 | −1 | 1 | 1 |

The E-DCH transmission profile information is made up of UL (Uplink) scrambling code, E-RNTI (Enhanced Radio Network Temporary Identity), DPCCH (Dedicated Physical Control Channel) code and timing offset, E-RGCH (E-DCH Relative Grant Channel) code, E-HICH (E-DCH Hybrid ARQ Indicator Channel) code, E-AGCH (E-DCH Absolute Grant Channel) code or the like. The base station sends an E-DCH transmission profile information list that includes a plurality of pieces of E-DCH transmission profile information and E-DCH transmission profile information numbers corresponding to the respective pieces of E-DCH transmission profile information to a user equipment in the cell on a regular basis through a BCH (Broadcast Channel). Then, the user equipment transmits a preamble. The base station transmits a reception result ACK by using the AICH and, at the same time, selects one E-DCH transmission profile information number and allocates it to the user equipment. The user equipment decides a transmission profile from E-DCH transmission profile information corresponding to the allocated E-DCH transmission profile information number and transmits uplink data to the base station (cf. e.g. Non Patent Document 7). A plurality of E-DCH transmission profile information numbers are allocated to one preamble signature. Further, the E-DCH transmission profile information number is specified by using an AICH signature combination. The AICH signature indicates a pair of an AICH signature number and an AICH signature state associated therewith, and a combination of a plurality of AICH signatures is called a signature combination. Further, a set of a plurality of AICH signature combinations is called an AICH signature combination set. The table 2 is an example of an AICH signature combination set table showing the AICH signature combination set.

TABLE 2

| PREAMBLE SIGNATURE | AICH SIGNATURE COMBINATION | RE-CEPTION RESULT | E-DCH TRANS-MISSION PROFILE INFOR-MATION NUMBER |
|---|---|---|---|
| 1 | 1, 2, 3 (0, 0, 0) | NO ACK | — |
| 1 | 1, 2, 3 (−1, −1, −1) | NACK | — |
| 1 | 1, 2, 3 (−1, −1, +1) | ACK | 1 |
| 1 | 1, 2, 3 (−1, +1, −1) | ACK | 2 |
| 1 | 1, 2, 3 (−1, +1, +1) | ACK | 3 |
| 1 | 1, 2, 3 (+1, −1, −1) | ACK | 4 |
| 1 | 1, 2, 3 (+1, −1, +1) | ACK | 5 |
| 1 | 1, 2, 3 (+1, +1, −1) | ACK | 6 |
| 1 | 1, 2, 3 (+1, +1, +1) | ACK | 7 |

Referring to the case where the reception result is ACK and the E-DCH transmission profile information number is 1 in the table 2 as an example, the AICH signature combination that is made up of three AICH signatures with the signature number of "1, 2, 3" and the signature state of (−1, −1, +1) is shown.

[Non Patent Document 1]

3GPP TS25.214 v7.5.0 May 2007

[Non Patent Document 2]

3GPP TS25.321 v7.2.0 September 2006

[Non Patent Document 3]

3GPP TS25.331 v7.3.0 December 2006

[Non Patent Document 4]

3GPP TS25.211 v7.3.0 September 2007

[Non Patent Document 5]

3GPP RP-070677 Nokia Siemens Networks, Nokia, Ericsson, Qual comm, T-Mobile, Telecom Italia, "Enhanced Uplink for CELL_FACH State in FDD" September 2007

[Non Patent Document 6]

3GPP TS25.319 v7.3.0

[Non Patent Document 7]

3GPP R2-074626 Nokia Corporation, Nokia Siemens Networks, "Resource assignment for E-DCH access in CELL_FACH state" November 2007

DISCLOSURE OF INVENTION

Technical Problem

In the method of allocating E-DCH transmission profile information which is proposed in Non Patent Document 7, the contents of a reception result cannot be recognized unless all of a plurality of AICH signature states are correctly decoded, which causes an increase in the error rate of signature decoding. Particularly, when the signature state indicating the reception result NACK of the AICH is incorrectly decoded into the signature state indicating the reception result ACK, a problem arises that an unallocated terminal performs transmission.

In view of the foregoing, an object of the present invention is to provide a channel allocation method and apparatus that can achieve reduction of a decoding error rate related to a reception result in a system where transmission profile information is allocated by using a plurality of signatures.

Technical Solution

To address the above concern, in the present invention, a communication system is provided in which a user equipment transmits a preamble to a base station, the base station receives the preamble and transmits a response to the preamble to the user equipment, and the user equipment performs data transmission through an uplink channel in response to the response, wherein the base station divides the response into a first signature and a second signature, and notifies information containing a reception result of the preamble to the user equipment by using one or a plurality of signatures among the first signature.

To address the above concern, in the present invention, a communication system is provided in which a user equipment transmits a preamble to a base station, the base station receives the preamble and transmits a response to the preamble to the user equipment, and the user equipment performs data transmission through an uplink channel in response to the response, wherein the base station sends a valid signature combination to the user equipment, and notifies a reception result of the preamble to the user equipment by the valid signature combination in the response.

To address the above concern, in the present invention, a system is provided in which a user equipment transmits a preamble to a base station, the base station receives the preamble and transmits a response to the preamble to the user equipment, and the user equipment performs data transmission through an uplink channel in response to the response, wherein the base station assigns a priority to a signature combination according to a predetermined condition, and notifies a reception result of the preamble to the user equipment by preferentially selecting a signature combination with a high priority in the response.

To address the above concern, in the present invention, a communication system is provided in which a user equipment transmits a preamble to a base station, the base station receives the preamble and transmits a response to the preamble to the user equipment, and the user equipment performs data transmission through an uplink channel in response to the response, wherein the base station constructs a response indicating a second reception result by using a signature state used for a response indicating a first reception result and at least one different signature state.

To address the above concern, in the present invention, a base station is provided that receives a preamble from a user equipment and transmits a response to the preamble to the user equipment, wherein the base station divides the response into a first signature and a second signature, and notifies information containing a reception result of the preamble to the user equipment by using one or a plurality of signatures among the first signature.

To address the above concern, in the present invention, a base station is provided that receives a preamble from a user equipment and transmits a response to the preamble to the user equipment, wherein the base station sends a valid signature combination to the user equipment, and notifies a reception result of the preamble to the user equipment by the valid signature combination in the response.

To address the above concern, in the present invention, a base station is provided that receives a preamble from a user equipment and transmits a response to the preamble to the user equipment, wherein the base station assigns a priority to a signature combination according to a predetermined condition, and notifies a reception result of the preamble to the user equipment by preferentially selecting a signature combination with a high priority in the response.

To address the above concern, in the present invention, a base station is provided that receives a preamble from a user equipment and transmits a response to the preamble to the user equipment, wherein the base station constructs a response indicating a second reception result by using a signature state used for a response indicating a first reception result and at least one different signature state.

To address the above concern, in the present invention, a user equipment is provided that transmits a preamble to a base station and receives a response to the preamble divided into a first signature and a second signature from the base station, wherein the user equipment determines a reception result of the preamble based on first one or a plurality of signatures in the response.

To address the above concern, in the present invention, a user equipment is provided that transmits a preamble to a base station and receives a response to the preamble from the base station, wherein the user equipment receives a valid signature combination from the base station and identifies a signature used for the response based on the valid signature combination.

To address the above concern, in the present invention, a method for a base station to notify a response to a user equipment is provided that includes a step of receiving a preamble from a user equipment, and a step of dividing a response to the preamble into a first signature and a second signature and notifies information containing a reception result of the preamble to the user equipment by using first one or a plurality of signatures among the first signature.

To address the above concern, in the present invention, a method for a base station to notify a response to a user equipment is provided that includes a step of receiving a preamble from a user equipment, a step of sending a valid signature combination to the user equipment in a response to the preamble, and a step of notifying a reception result of the preamble to the user equipment by the valid signature combination in the response.

To address the above concern, in the present invention, a method for a base station to notify a response to a user equipment is provided that includes a step of receiving a preamble from a user equipment, a step of assigning a priority to a signature combination according to a predetermined condition in a response to the preamble, and a step of notifying a reception result of the preamble to the user equipment by preferentially selecting a signature combination with a high priority in the response.

To address the above concern, in the present invention, a method for a base station to notify a response to a user equipment is provided that includes a step of receiving a preamble from a user equipment, and a step of constructing a response indicating a second reception result by using a signature state used for a response indicating a first reception result and at least one different signature state in a response to the preamble.

To address the above concern, in the present invention, a method for a user equipment to determine a reception result is provided that includes a step of receiving a response divided into a first signature and a second signature to a preamble transmitted to a base station from the base station, and a step of determining a reception result of the preamble based on first one or a plurality of signatures in the response.

To address the above concern, in the present invention, a method for a user equipment to identify a signature is provided that includes a step of receiving a valid signature combination from a base station, a step of receiving a response to a preamble transmitted to the base station from the base station, and a step of identifying a signature used for the response based on the valid signature combination.

To address the above concern, in the present invention, a program causing an information processing device to execute processing is provided wherein the program causes the information processing device to execute processing that constructs information containing a reception result of a preamble from a user equipment received by a base station by using a certain signature of a plurality of signatures.

To address the above concern, in the present invention, a program causing an information processing device to execute processing is provided wherein the program causes the information processing device to execute processing that sends a valid or invalid signature combination to a user equipment in a response to a preamble from the user equipment received by a base station, and notifies a reception result of the preamble to the user equipment by the valid signature combination in the response.

To address the above concern, in the present invention, a program causing an information processing device to execute processing is provided wherein the program causes the information processing device to execute processing that assigns a priority to a signature combination according to a predetermined condition in a response to a preamble from a user equipment received by a base station, and notifies a reception result of the preamble to the user equipment by preferentially selecting a signature combination with a high priority in the response.

To address the above concern, in the present invention, a program causing an information processing device to execute processing is provided wherein the program causes the information processing device to execute processing that constructs a response indicating a second reception result by using a signature state used for a response indicating a first reception result and at least one signature state different from the signature state in a response to a preamble from a user equipment received by a base station.

To address the above concern, in the present invention, a program causing an information processing device to execute processing is provided wherein the program causes the information processing device to execute processing that receives a response using a plurality of signatures to a preamble transmitted to a base station from the base station and determines a reception result of the preamble based on a certain signature of the plurality of signatures.

To address the above concern, in the present invention, a program causing an information processing device to execute processing is provided wherein the program causes the information processing device to execute processing that receives a valid or invalid signature combination from a base station, receives a response to a preamble transmitted to the base station from the base station, and identifies a signature used for the response based on the valid signature combination.

Advantageous Effects

According to the present invention, it is possible to achieve reduction of a decoding error rate related to a reception result in a system where transmission profile information is allocated by using a plurality of signatures.

EXPLANATION OF REFERENCE

10 BASE STATION
20 USER EQUIPMENT
101 RADIO COMMUNICATION UNIT
102 UPLINK RECEPTION PROCESSING UNIT
103 UPLINK TRANSMISSION PROCESSING UNIT
104 COMMUNICATION UNIT
105 DOWNLINK RECEPTION PROCESSING UNIT
106 DOWNLINK TRANSMISSION PROCESSING UNIT
107 E-DCH TRANSMISSION PROFILE INFORMATION GENERATION UNIT
108 PREAMBLE IDENTIFYING UNIT
109 ALLOCATION RESOURCE CONTROL UNIT
201 RADIO COMMUNICATION UNIT

202 RECEPTION PROCESSING UNIT
203 RECEPTION RESULT PROCESSING UNIT
204 TRANSMISSION DATA CONTROL UNIT
205 E-DCH TRANSMISSION PROFILE INFORMATION HOLDING UNIT
206 TRANSMISSION PROCESSING UNIT
207 BUFFER

BEST MODE FOR CARRYING OUT THE INVENTION

First Embodiment

In this embodiment, a base station has a feature that it uses, out of a signature combination, the signature of at least one predetermined position to indicate information containing a preamble reception result and uses the signature of a position other than the predetermined position to indicate a transmission profile information number of the uplink channel for notification to a user equipment.

Hereinafter, a system in which a base station uses, out of the signature combination made up of three AICH signatures, uses the first AICH signature to indicate a preamble reception result and uses the second and third AICH signatures to indicate an E-DCH transmission profile information number for notification to the user equipment is described by way of illustration.

Figure 1:
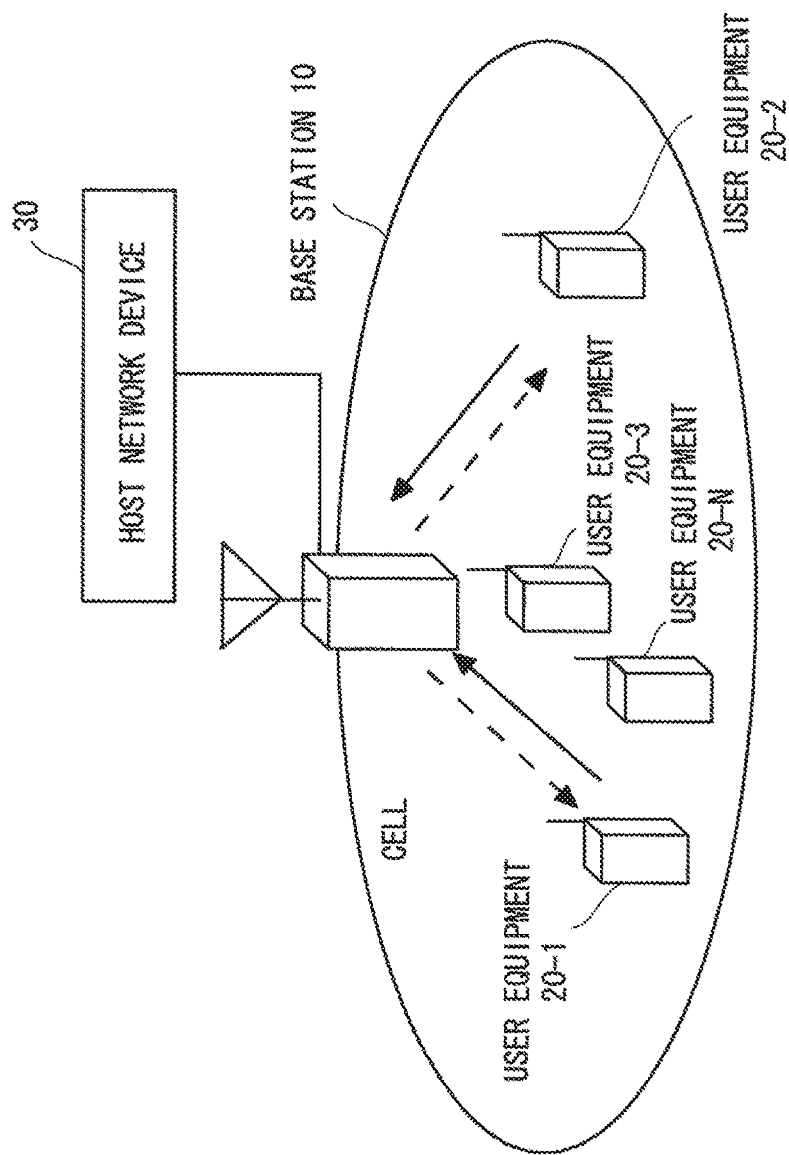
FIG. 1 is a block diagram showing a configuration of a mobile communication system.
Figure 2:
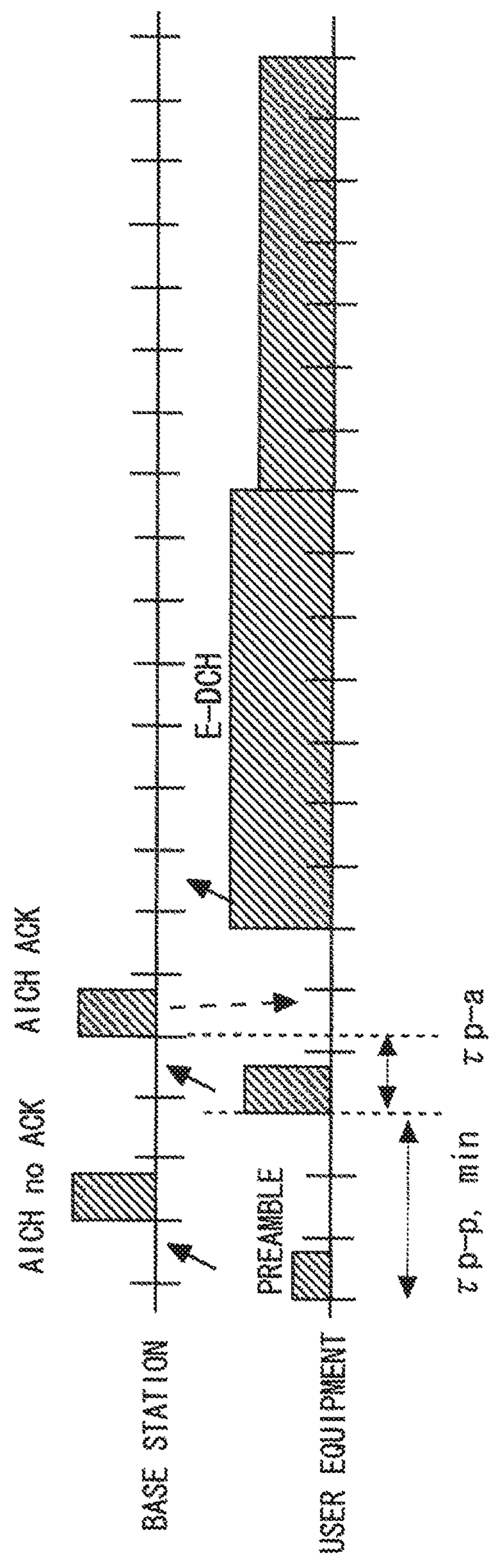
FIG. 2 is a diagram showing an operation of an E-RACH.
Figure 3:
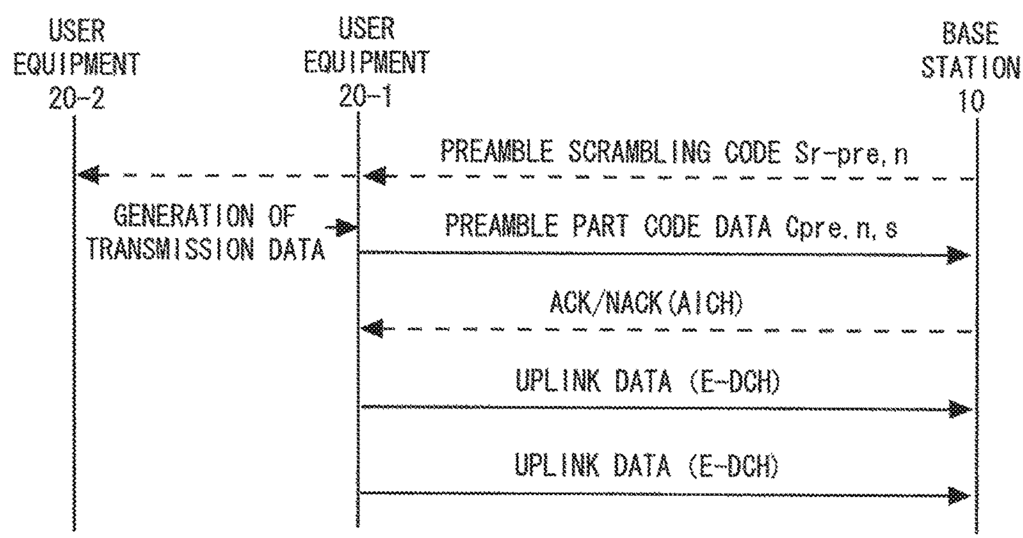
FIG. 3 is a sequence chart of channel setting such as an E-RACH.
Figure 4:
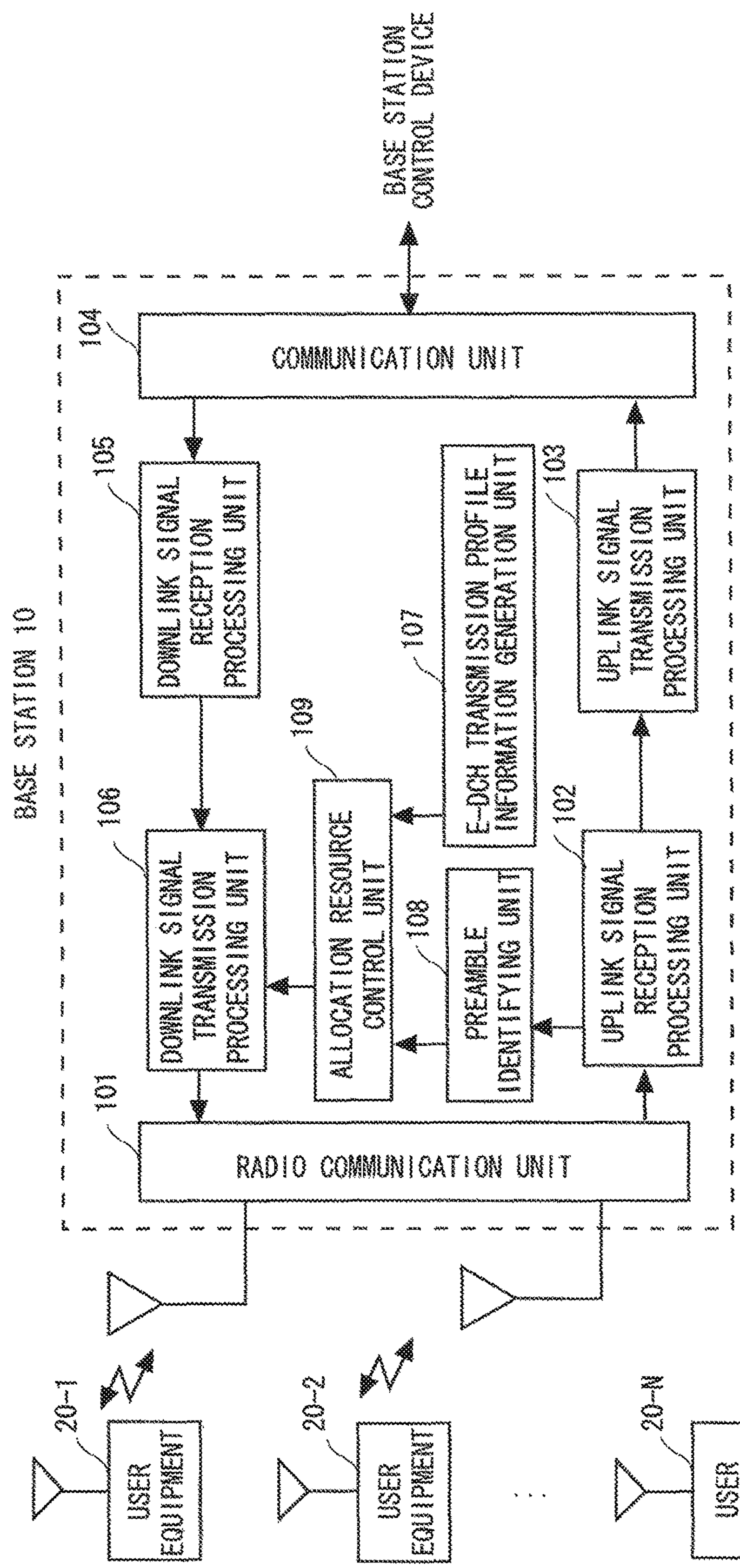
FIG. 4 is a block diagram showing an example of a configuration of a base station in a radio communication system according to the present invention.

FIG. 4 is a block diagram showing an example of a configuration of a base station in a radio communication system according to the present invention. A base station 10 includes a radio communication unit 101 that performs radio communication with an user equipment 20, an uplink signal reception processing unit 102 that processes an uplink signal received from each user equipment, an uplink signal transmission processing unit 103 that performs processing for transmitting transfer data in the uplink signal to a host network device (base station control device), and a communication unit 104 that transmits data to the host network device. Data from the host network device is received by the communication unit 104 and then processed by a downlink signal reception processing unit 105. Processing for transmitting a downlink signal to a user equipment is performed by a downlink signal transmission processing unit 106, and it is transmitted from the radio communication unit 101 to the destination user equipment.

Further, the base station 10 includes a preamble identifying unit 108 that is connected to the uplink signal reception processing unit 102, an E-DCH transmission profile information generation unit 107, and an allocation resource control unit 109. In the case of receiving a preamble from a user equipment, the uplink signal reception processing unit 102 transfers it to the preamble identifying unit 108, and in other cases, it makes transfer to the uplink signal transmission processing unit 103. The preamble identifying unit 108 identifies a preamble signature from the preamble transferred from the uplink signal reception processing unit 102 and notifies the identified information to the allocation resource control unit 109. The E-DCH transmission profile information generation unit 107 generates E-DCH transmission profile information used in the E-RACH and a corresponding E-DCH transmission profile information number at regular intervals and outputs them to the allocation resource control unit 109. The allocation resource control unit 109 has an E-DCH transmission profile information list that includes the E-DCH transmission profile information and the E-DCH transmission profile information number that are transferred from the E-DCH transmission profile information generation unit 107. The allocation resource control unit outputs the E-DCH transmission profile information list to the downlink signal transmission processing unit 106, and the downlink signal transmission processing unit 106 sends the E-DCH transmission profile information list that is received from the transmission processing unit 106 to a user equipment in the cell through the radio communication unit 101.

Further, the allocation resource control unit 109 holds an AICH signature combination set table that combines an E-DCH transmission profile information number, a preamble signature, an AICH signature and a reception result, and when a preamble identification result is transferred from the preamble identifying unit 108, it selects an available one of E-DCH profiles corresponding to the preamble signature from the held AICH signature combination set table, and outputs the E-DCH transmission profile information number, together with the preamble signature and the reception result, to the transmission processing unit 106. The downlink signal transmission processing unit 106 transmits the reception result, the E-DCH transmission profile information number and so on to a user equipment through the radio communication unit 101.

Although the AICH signature combination set table is held by the allocation resource control unit 109 in the above description, it may be held by the E-DCH transmission profile information generation unit 107, or it may be held by a storage unit which is placed separately. In this case, an operation that the E-DCH transmission profile information generation unit 107 notifies the AICH signature combination set table to the allocation resource control unit 109 or an operation that the allocation resource control unit 109 reads the AICH signature combination set table from the E-DCH transmission profile information generation unit 107 or the storage unit is necessary.

Note that functions equivalent to the preamble identifying unit 108, the E-DCH transmission profile information generation unit 107 and the allocation resource control unit 109 may be implemented by executing programs of corresponding functions on a program control processor such as a CPU. Further, a part related to the channel allocation method according to the present invention is shown therein, and the other component part is omitted.

Figure 5:
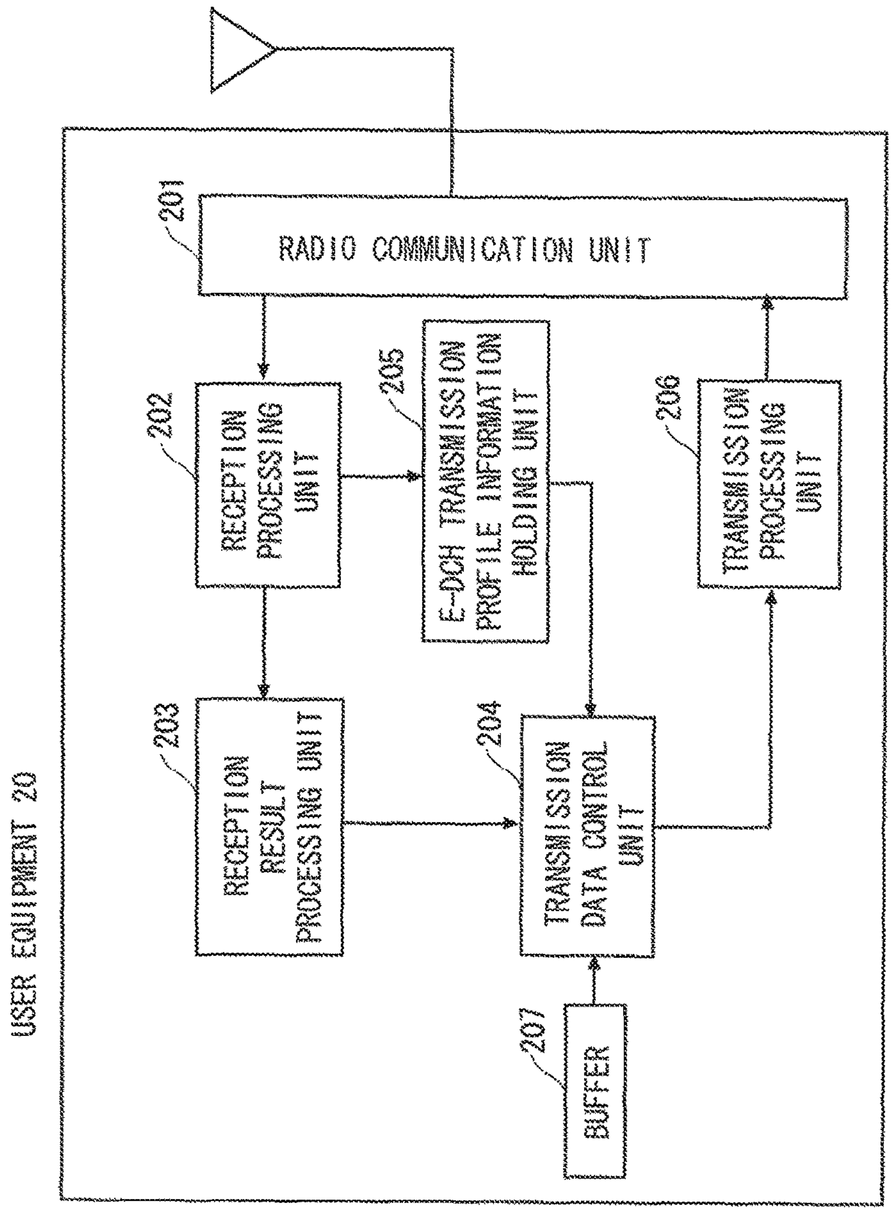
FIG. 5 is a block diagram showing an example of a configuration of a user equipment in a radio communication system according to the present invention.

FIG. 5 is a block diagram showing an example of a configuration of a user equipment in a radio communication system according to the present invention. The user equipment 20 includes a radio communication unit 201 that performs radio communication with the base station, a reception processing unit 202, a reception result processing unit 203, a transmission data control unit 204, an E-DCH transmission profile information holding unit 205, a transmission processing unit 206, and a buffer 207. A part related to the channel allocation method according to the present invention is shown therein, and the other component part is omitted.

The reception processing unit 202 receives data from the base station through the radio communication unit 201, and when the data is a reception result for a preamble, it transfers the data to the reception result processing unit 203, and when the data is an E-DCH transmission profile information list, it transfers the data to the E-DCH transmission profile information holding unit 205. The reception result processing unit 203 extracts a reception result for a preamble and an E-DCH transmission profile information number that is contained when the reception result is ACK from the reception result for a preamble which is input from the reception processing unit 202. The E-DCH transmission profile information number is transferred to the transmission data control unit 204. The transmission data control unit 204 decides an E-DCH transmission profile to be used for the E-RACH from the E-DCH transmission profile information number that is input from the reception result processing unit 203, the E-DCH transmission profile information list that is held by the E-DCH transmission profile information holding unit 205, and a buffer amount of transmission data that is accumulated in the buffer 207, and outputs it to the transmission processing unit 206. The transmission processing unit 206 sets an uplink channel based on the E-DCH transmission profile that is input from the transmission data control unit 204 and transmits data to the base station through the radio communication unit 201.

Note that functions equivalent to the reception result processing unit 203 and the transmission data control unit 204 may be implemented by executing programs of the corresponding functions on a program control processor such as a CPU.

Figure 6:
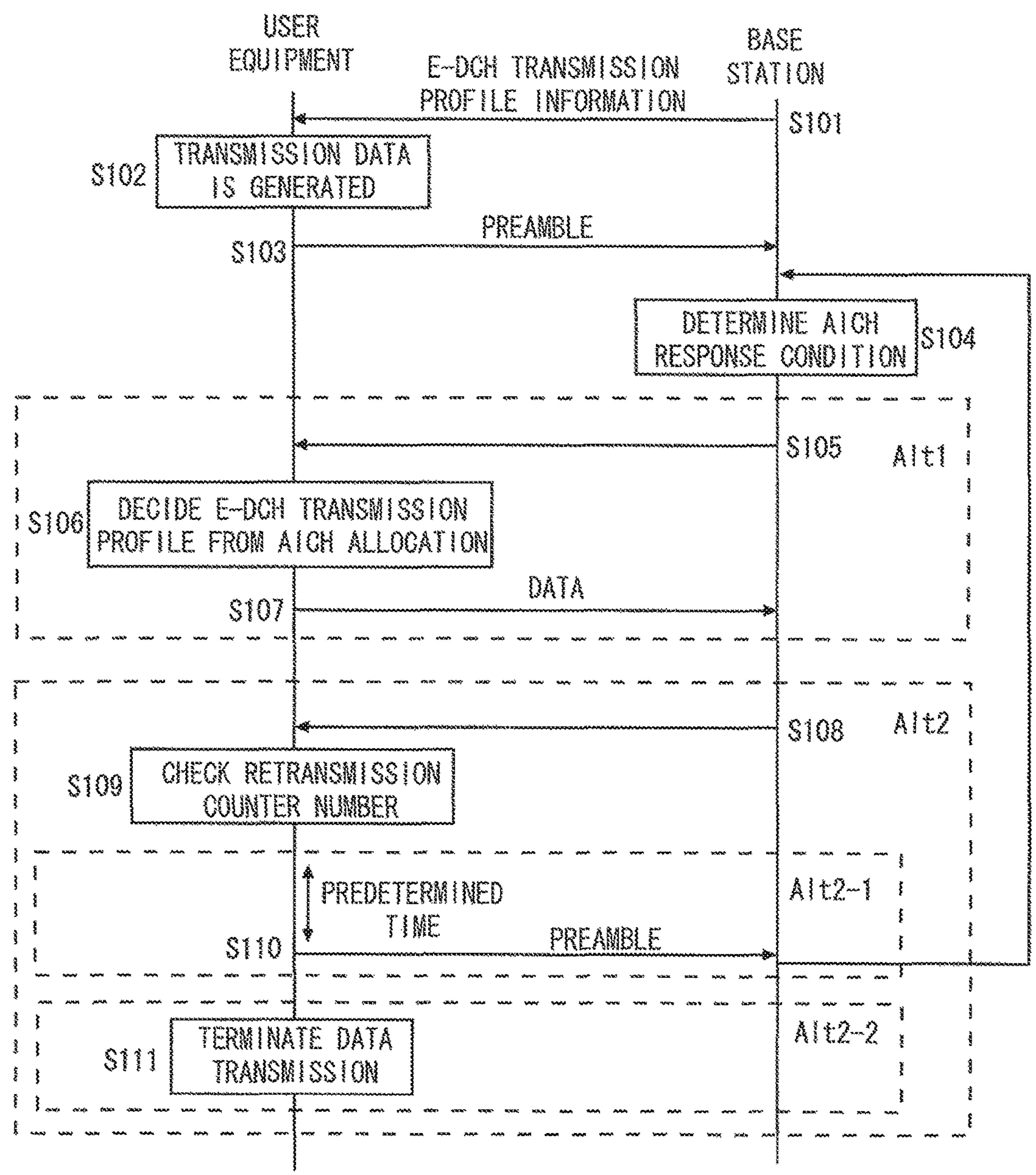
FIG. 6 is a sequence chart showing a procedure of data transmission according to an embodiment.

FIG. 6 is a sequence chart showing a procedure of data transmission according to an embodiment.

The base station sends the E-DCH transmission profile information list to the user equipment in the cell through the BCH at regular intervals (step S101). The E-DCH transmission profile information holding unit 205 of the user equipment holds the received E-DCH transmission profile information list and, when receiving a new E-DCH transmission profile information list, it updates the information.

When transmission data is generated in the buffer 207 of the user equipment (step S102), the transmission data control unit 204 transmits a preamble to the base station as described above (step S103). After receiving the preamble, the base station performs processing of an AICH response condition determination step that determines whether available E-DCH transmission profile information exists or not (step S104). If available E-DCH transmission profile information exists in the step S104, processing of Alt1 is performed. In Alt1, a reception result ACK and an E-DCH transmission profile information number are transmitted to the user equipment by using the AICH (step S105), and the user equipment decides an E-DCH transmission profile by using the E-DCH transmission profile information that is previously sent from the base station through the BCH and the E-DCH transmission profile information number that is notified through the AICH (step S106), and transmits uplink data by using the E-DCH transmission profile (step S107). If available E-DCH transmission profile information does not exist in the step S104, processing of Alt2 is performed. In Alt2, a reception result NACK is transmitted to the user equipment by using the AICH (step S108), and the user equipment checks a retransmission counter (step S109). If the remaining number of the retransmission counter is not 0, retransmission of a preamble is performed after the lapse of predetermined waiting time, which is processing of Alt2-1 (step S110), and if the remaining number of the retransmission counter is 0, processing of Alt2-2 that terminates data transmission is performed (step S111).

The table 3 is an example of an AICH signature combination set table that is held by the allocation resource control unit 109. In this embodiment, the AICH signature combination is made up of three signatures. In the example of the table 3, the first AICH signature indicates a reception result of a preamble, and the second and third signatures indicate an E-DCH transmission profile information number.

TABLE 3

| PREAMBLE SIGNATURE | AICH SIGNATURE COMBINATION | RECEPTION RESULT | E-DCH TRANSMISSION PROFILE INFORMATION NUMBER |
|---|---|---|---|
| 1 | 1, 2, 3 (0, 0, 0) | NO ACK | — |
| 1 | 1, 2, 3 (−1, 0, 0) | NACK | — |
| 1 | 1, 2, 3 (+1, −1, −1) | ACK | 1 |
| 1 | 1, 2, 3 (+1, −1, +1) | ACK | 2 |
| 1 | 1, 2, 3 (+1, +1, −1) | ACK | 3 |
| 1 | 1, 2, 3 (+1, +1, +1) | ACK | 4 |

Figure 7:
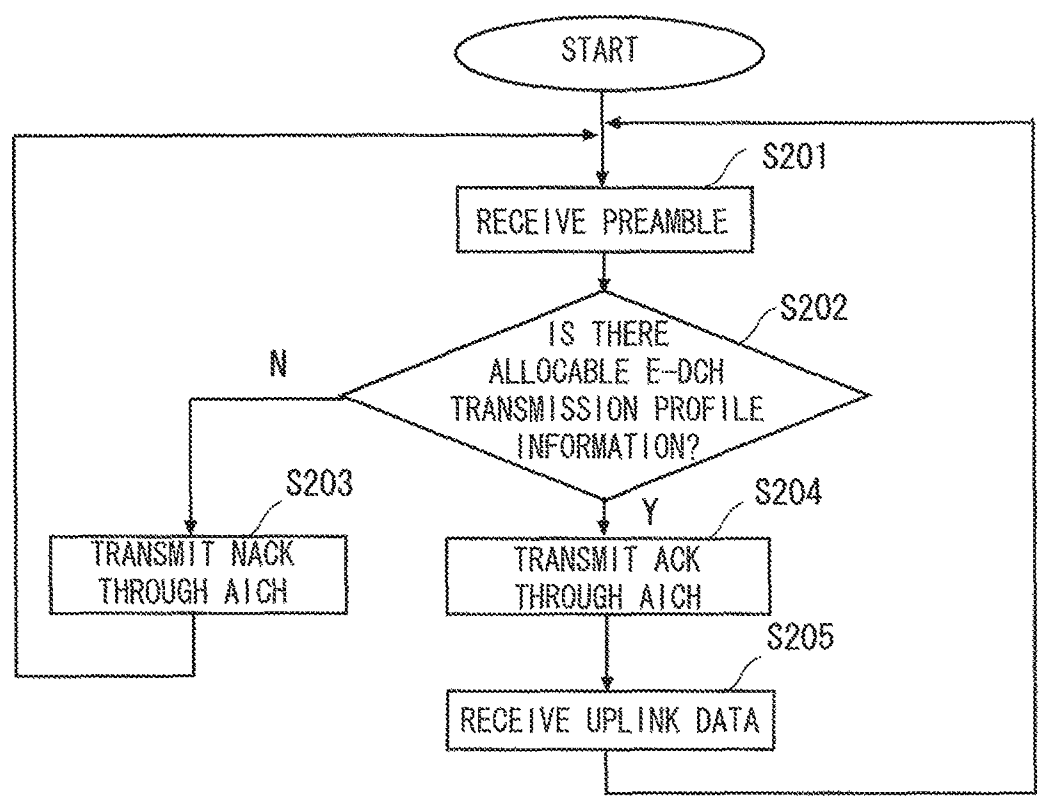
FIG. 7 is a flowchart showing an operation of a base station according to embodiments 1, 2, 4, 6, 7 and 8 of the present invention.

FIG. 7 is a flowchart showing an operation of the base station, particularly the allocation resource control unit 109, in the step S104 that determines a response of the AICH. In response to reception of the preamble transmitted from the user equipment, the base station starts the control operation in FIG. 7.

The base station receives the preamble that is transmitted from the user equipment (step S201) and determines whether available E-DCH transmission profile information exists or not in the E-DCH transmission profile information allocated to the E-RACH (step S202). If available E-DCH transmission profile information does not exist, the base station notifies the reception result NACK by using the AICH (step S203). If available E-DCH transmission profile information exists in the step S202, the base station notifies the reception result ACK and the selected E-DCH transmission profile information number to the user equipment by using the AICH (step S204) and then proceeds to step S205. In the step S205, the base station receives uplink data that is transmitted from the user equipment and returns to a preamble reception waiting state (step S201).

Hereinafter, the operation of the step S202 is specifically described with reference to the tables 4 and 5, which show examples of the AICH signature combination set table that is held by the allocation resource control unit 109. The base station holds information about whether E-DCH transmission profile information is available or not in the AICH signature combination set table. The information is held as a state, for example, in the tables 4 and 5 and "Busy" indicates that it is unavailable, and "Available" indicates that it is available. Although the information held as a state is represented by a two-valued figure in the above description, it is not limited to two-valued.

When receiving the preamble that is transmitted from the user equipment, the base station identifies a preamble signature number. The base station then determines whether available E-DCH transmission profile information exists among E-DCH transmission profile information allocated to the identified preamble signature number. Assume that the preamble signature number of the preamble which the base station receives from the user equipment is 1. The table 4 is an example of the AICH signature combination set table in the case where ACK is sent through the AICH. In this example, because the E-DCH transmission profile information number 4 is available, the base station notifies that the reception result is ACK and the E-DCH transmission profile information number is 4 to the user equipment.

TABLE 4

| PREAMBLE SIGNATURE | AICH SIGNATURE COMBINATION | RE-CEPTION RESULT | E-DCH TRANS-MISSION PROFILE INFOR-MATION NUMBER | STATE |
|---|---|---|---|---|
| 1 | 1, 2, 3 (0, 0, 0) | NO ACK | — | |
| 1 | 1, 2, 3 (−1, 0, 0) | NACK | — | |
| 1 | 1, 2, 3 (+1, −1, −1) | ACK | 1 | Busy |
| 1 | 1, 2, 3 (+1, −1, +1) | ACK | 2 | Busy |
| 1 | 1, 2, 3 (+1, +1, −1) | ACK | 3 | Busy |
| 1 | 1, 2, 3 (+1, +1, +1) | ACK | 4 | Available |

The table 5 is an example of the AICH signature combination set table in the case where NACK is sent through the AICH. In this example, because no available E-DCH transmission profile information number exists, the base station notifies that the AICH is NACK to the user equipment.

TABLE 5

| PREAMBLE SIGNATURE | AICH SIGNATURE COMBINATION | RE-CEPTION RESULT | E-DCH TRANS-MISSION PROFILE INFOR-MATION NUMBER | STATE |
|---|---|---|---|---|
| 1 | 1, 2, 3 (0, 0, 0) | NO ACK | — | |
| 1 | 1, 2, 3 (−1, 0, 0) | NACK | — | |
| 1 | 1, 2, 3 (+1, −1, −1) | ACK | 1 | Busy |
| 1 | 1, 2, 3 (+1, −1, +1) | ACK | 2 | Busy |
| 1 | 1, 2, 3 (+1, +1, −1) | ACK | 3 | Busy |
| 1 | 1, 2, 3 (+1, +1, +1) | ACK | 4 | Busy |

Figure 8:
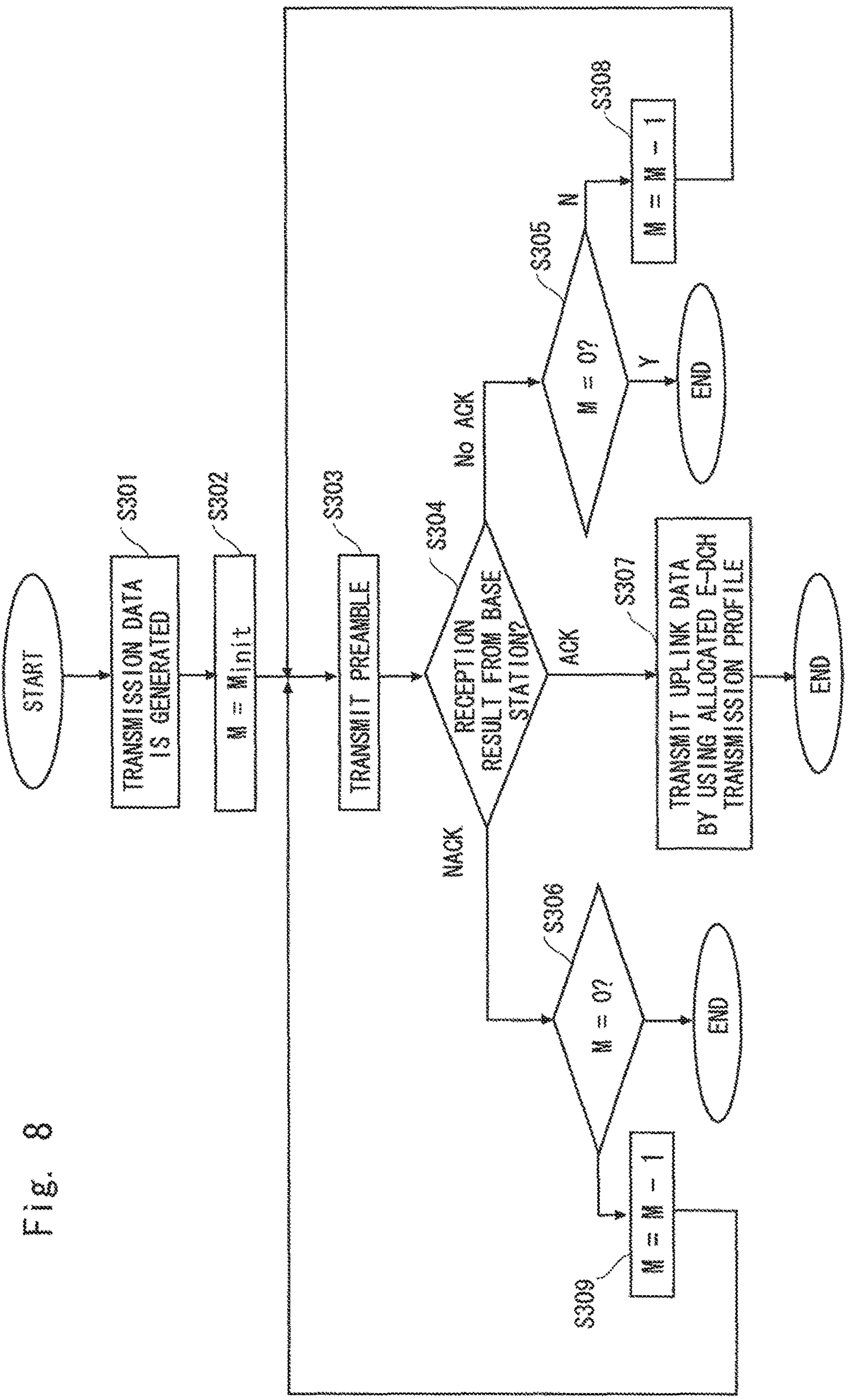
FIG. 8 is a flowchart showing an operation of a user equipment according to an embodiment 1 of the present invention.

FIG. 8 is a flowchart showing an operation of the user equipment, particularly the transmission data control unit 204, in this embodiment. In response to generation of transmission data in the buffer 207, the user equipment starts the control operation in FIG. 8 (step S301).

After the operation of the step S301, the user equipment sets an initial value Minit to a retransmission counter M (step S302), performs processing of a preamble transmission step S that transmits a preamble to the base station (step S303), and then enters a reception waiting state of the AICH containing a preamble reception result from the base station (step S304). If the reception result contained in the AICH from the base station is ACK in the step S304, the user equipment decides an E-DCH transmission profile from the E-DCH transmission profile information number that is notified together with the reception result and the E-DCH transmission profile information that is previously sent from the base station, and transmits uplink data to the base station by using the E-DCH transmission profile (step S307). If the reception result contained in the AICH from the base station is No ACK in the step S304, the remaining number of the retransmission counter M is checked (step S305). If the remaining number of the retransmission counter is 0, data transmission is terminated, and if it is not 0, the retransmission counter M is decremented by 1 (step S308), and it returns to the preamble transmission step S after a predetermined time (step S303). If the reception result contained in the AICH from the base station is NACK in the step S304, the remaining number of the retransmission counter M is checked (step S306). If the retransmission counter M is 0, data transmission is terminated, and if it is not 0, the retransmission counter M is decremented by 1 (step S309), and it returns to the preamble transmission step S after a predetermined time (S303).

Although the AICH signature number is 1 to 3 in the above description of the embodiment, it is not limited to 1 to 3, and it may be sequential numbers such as 4 to 6 or non-sequential numbers such as 1, 3 and 5. Further, the number of AICH signatures is not limited to three, and it may be an arbitrary number. Note that, although the AICH signature indicating a preamble reception result corresponds to the signature number 1 in the above description of the embodiment, it may correspond to an arbitrary number, and it is not limited to a single number.

Because the base station uses, out of a signature combination, the signature of at least one predetermined position to indicate information containing a preamble reception result and uses the signature of a position other than the predetermined position to indicate a transmission profile information number of the uplink channel for notification to the user equipment, an advantage is obtained that it is possible to reduce an error rate related to a reception result compared to the case where a single signature combination is used to notify all pieces of information.

Further, because a reception result can be recognized by the signature of at least one predetermined position, an advantage is obtained that it is possible to reduce calculation processing about a reception result for which it is not necessary to determine a transmission profile information number of the uplink channel.

Second Embodiment

In this embodiment, the base station has a feature that it specifies information related to use or nonuse of a signature combination and sends it to a user equipment.

Hereinafter, a system in which the base station performs transmission of an AICH by setting invalid that indicates not using an AICH signature combination in which an intercode distance from an AICH signature combination whose reception result indicates NACK is within a predetermined length and setting valid that indicates using an AICH signature combination in which it is not within the predetermined length is described by way of illustration.

Although the basic configuration of this embodiment is the same as that of the first embodiment, the processing of notifying E-DCH transmission profile information (step S101) and the AICH response condition determination step (step S104) shown in the sequence chart of FIG. 6 and the contents set to the AICH signature combination set table held by the allocation resource control unit 109 are different.

When the intercode distance between signature combinations is short, the probability of erroneous recognition upon transmission from the base station to the user equipment is higher than when the intercode distance is long. In this embodiment, the signature combination indicating NACK "1, 2, 3 (−1, −1, −1)" is used as a reference, and a combination located in a position closer than a predetermined intercode distance ΔL1 is set to invalid.

Specifically, the intercode distance ΔL is represented by the mathematical expression (3).

[Expression 3]

$$\Delta L=\sqrt{(|x1-x2|^2+|y1-y2|^2+|z1-z2|^2)} \quad (3)$$

x1, x2: the first AICH signature state in the AICH signature combination y1, y2; the second AICH signature state in the AICH signature combination z1, z2; the third AICH signature state in the AICH signature combination If the signature combination "1, 2, 3 (−1, −1, −1)" indicating NACK is a reference, and the signature state "1, 2, 3 (−1, −1, +1)" where the E-DCH transmission profile information number is 1 is taken as an example, x1=−1, x2=−1, y1=−1, y2=−1, z1=−1, z2=+1, and the intercode distance ΔL is 2.

The AICH signature combination is set to valid or invalid according to the following conditions:

ΔL1≥ΔL: invalid

ΔL1<ΔL: valid where ΔL indicates an intercode distance, and ΔL1 indicates a predetermined intercode distance.

The table 6 is an example of the AICH signature combination set table showing whether each AICH signature combination is valid or invalid in the case of ΔL1=2. The section of valid/invalid represents information indicating whether it is valid or invalid.

TABLE 6

| PREAMBLE SIGNATURE | AICH SIGNATURE COMBINATION | RE-CEPTION RESULT | E-DCH TRANS-MISSION PROFILE INFOR-MATION NUMBER | VALID/ INVALID |
|---|---|---|---|---|
| 1 | 1, 2, 3 (0, 0, 0) | NO ACK | — | — |
| 1 | 1, 2, 3 (−1, −1, −1) | NACK | — | — |
| 1 | 1, 2, 3 (−1, −1, +1) | ACK | 1 | INVALID |
| 1 | 1, 2, 3 (−1, +1, −1) | ACK | 2 | INVALID |
| 1 | 1, 2, 3 (−1, +1, +1) | ACK | 3 | VALID |
| 1 | 1, 2, 3 (+1, −1, −1) | ACK | 4 | INVALID |
| 1 | 1, 2, 3 (+1, −1, +1) | ACK | 5 | VALID |
| 1 | 1, 2, 3 (+1, +1, −1) | ACK | 6 | VALID |
| 1 | 1, 2, 3 (+1, +1, +1) | ACK | 7 | VALID |

The base station notifies E-DCH transmission profile information and a valid AICH signature combination to the user equipment through the BCH in the step S101, and allocates the valid AICH signature combination shown in the table 6 to the user equipment in the step S202. Although a valid AICH signature combination is notified in the above description of the embodiment, an invalid AICH signature combination may be notified, or information of both valid and invalid may be notified. In the form that notifies information of both valid and invalid, a flag indicating each state is needed. The flag may be notified. Further, the user equipment may have the information in advance so as not to perform processing of providing notification from the base station.

In this embodiment, because the base station specifies information related to use or nonuse of signature combinations of the downlink common channel and sends it to the user equipment, the user equipment can limit the signature combinations to be used for a reception result from the base station. An advantage that it is possible to reduce calculation processing can be thereby obtained. Further, an advantage that it is possible to reduce an error rate related to a reception result can be obtained.

Although the AICH signature combination with the intercode distance within a predetermined length is set to invalid in this embodiment, setting of valid or invalid may be changed according to the number of user equipments which perform data transmission through the E-RACH in the cell, an index or the like on which a target system places great importance or the like.

An example of such a case is shown below. When there are a large number of user equipments which perform data transmission through the E-RACH or when it is intended to reduce the blocking probability, all AICH signatures are set to valid.

ΔL1≥ΔL: valid

ΔL1<ΔL: valid

When there are a small number of user equipments which perform data transmission through the E-RACH or when it is intended to reduce the signature error rate, an AICH signature combination in which the intercode distance is within a predetermined length is set to invalid, and an AICH signature combination in which the intercode distance is not within a predetermined length is set to valid.

ΔL1≥ΔL: invalid

ΔL1<ΔL: valid

In this manner, by making setting of valid or invalid changeable, an advantage that it is possible to implement an adequate system operation is obtained in addition to the advantage that it is possible to reduce calculation processing and the advantage that it is possible to reduce an error rate related to a reception result.

Third Embodiment

In this embodiment, the base station has a feature that it assigns priorities to signature combinations and preferentially allocates a signature combination with a high priority to the user equipment.

Hereinafter, a system in which transmission of an AICH is performed by setting a low use priority to an AICH signature combination in which an intercode distance from an AICH signature combination whose reception result indicates NACK is within a predetermined length and sets a high use priority to an AICH signature combination in which it is not within the predetermined length is described by way of illustration.

Although the basic configuration of this embodiment is the same as that of the first embodiment, the operation of the AICH response condition determination (step S104) shown in the sequence chart of FIG. 6 and the contents set to the AICH signature combination set table held by the allocation resource control unit 109 are different.

Although the AICH signature combination located in a position where the intercode distance is closer than the predetermined intercode distance ΔL1 is set to nonuse in the second embodiment, the priorities of allocation are varied as follows based on a result of the intercode distance obtained by the mathematical expression (2) in this embodiment.

ΔL1≥ΔL: low priority

ΔL1<ΔL: high priority

In this embodiment, preamble reception results and allocation of E-DCH transmission profile information numbers are the same as those of the table 6 shown in the second embodiment. The table 7 is an example of the AICH signature combination set table showing the priorities of AICH signature combinations based on the above conditions in the case of ΔL1=2.

TABLE 7

| PREAMBLE SIGNATURE | AICH SIGNATURE COMBINATION | RE-CEPTION RESULT | E-DCH TRANS-MISSION PROFILE INFOR-MATION NUMBER | PRIORITY |
|---|---|---|---|---|
| 1 | 1, 2, 3 (0, 0, 0) | NO ACK | — | — |
| 1 | 1, 2, 3 (−1, −1, −1) | NACK | — | — |
| 1 | 1, 2, 3 (−1, −1, +1) | ACK | 1 | LOW |
| 1 | 1, 2, 3 (−1, +1, −1) | ACK | 2 | LOW |
| 1 | 1, 2, 3 (−1, +1, +1) | ACK | 3 | HIGH |
| 1 | 1, 2, 3 (+1, −1, −1) | ACK | 4 | LOW |
| 1 | 1, 2, 3 (+1, −1, +1) | ACK | 5 | HIGH |
| 1 | 1, 2, 3 (+1, +1, −1) | ACK | 6 | HIGH |
| 1 | 1, 2, 3 (+1, +1, +1) | ACK | 7 | HIGH |

In the step S104, when an AICH signature combination with a high priority exists, the base station allocates the AICH signature combination with a high priority to the user equipment, and when an AICH signature combination with a high priority does not exist, it allocates the AICH signature combination with a low priority to the user equipment.

Figure 9:
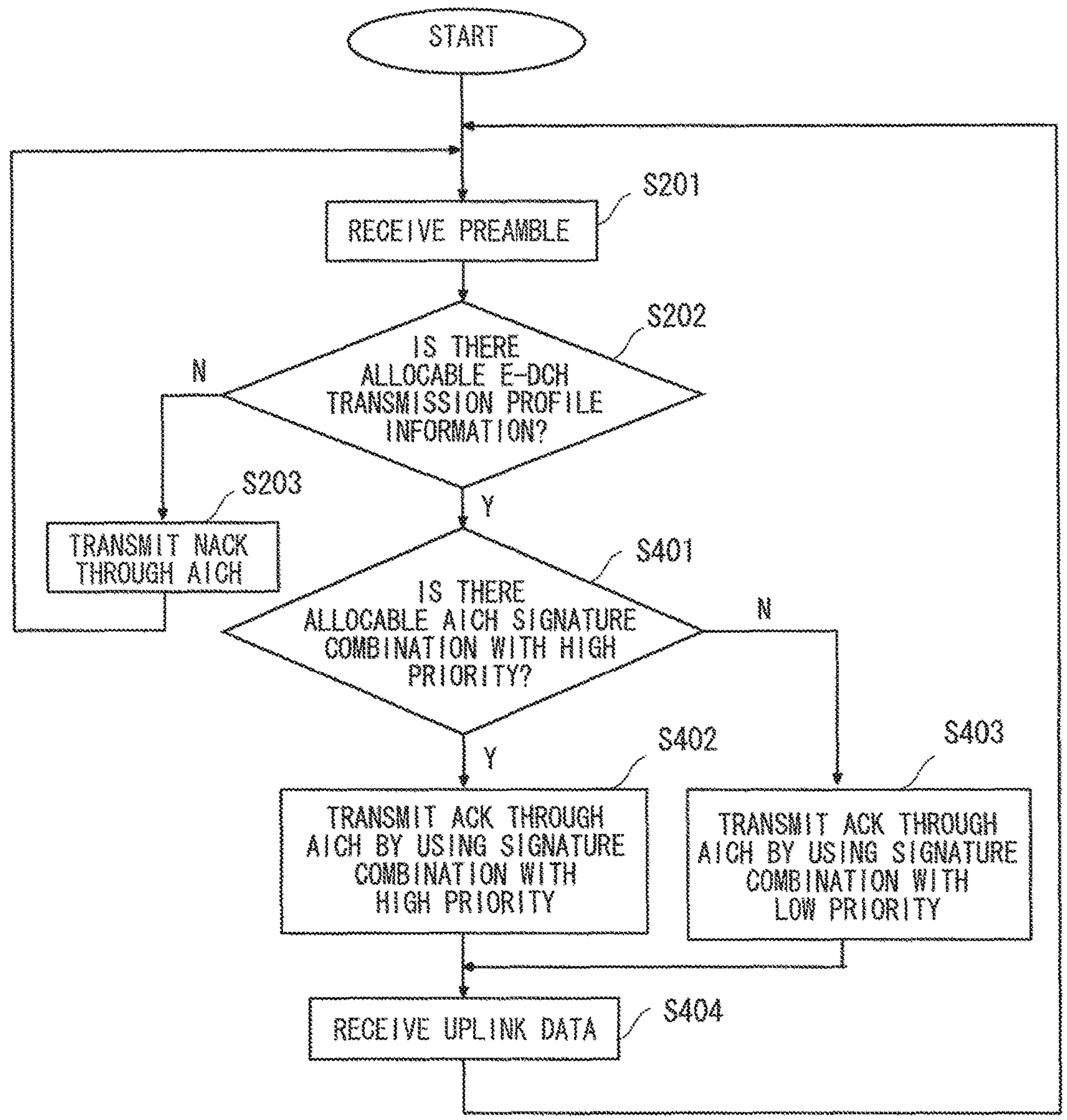
FIG. 9 is a flowchart showing an operation of a base station according to embodiments 3, 5 and 7 of the present invention.

FIG. 9 is a flowchart showing the operation of the base station in this embodiment. It is different from FIG. 7 in that the step S401 to the step S404 that are processing of allocating an AICH signature combination in consideration of priorities are added.

Hereinafter, the step S401 to the step S404, which differ from FIG. 7, are described.

When available E-DCH transmission profile information exists in the step S202, the base station determines whether there is an allocable AICH signature combination with a high priority (step S401). When an AICH signature combination with a high priority exists in the step S401, the base station notifies the reception result ACK and the E-DCH transmission profile information number corresponding to the AICH signature combination with a high priority to the user equipment by using the AICH (step S402), and when an AICH signature combination with a high priority does not exist, the base station notifies the reception result ACK and the E-DCH transmission profile information number corresponding to the AICH signature combination with a low priority to the user equipment by using the AICH (step S403). After the processing of the step S402 and the step S403, the base station receives uplink data transmitted from the user equipment (step S404) and returns to the preamble reception waiting state (step S201).

Although the priority is represented by a two-valued figure of high or low in this embodiment, it is not limited to two-valued, and an arbitrary number may be applied as long as it distinguishes the priority;

In this embodiment, because the base station assigns priorities to signature combinations and preferentially allocates a signature combination with a high priority to a user equipment, a signature combination with a low signature error rate is frequency used, and a signature combination with a high signature error rate is less frequency used, so that an advantage that it is possible to reduce an error rate related to a reception result in the whole system can be obtained.

Fourth Embodiment

In this embodiment, the base station has a feature that it uses a signature combination indicating the reception result NACK that is different from a signature combination indicating the reception result ACK.

Hereinafter, a system in which transmission of an AICH is performed by including 0 in the signature combination indicating the reception result NACK is described by way of illustration.

Although the basic configuration of this embodiment is the same as that of the first embodiment, the contents set to the AICH signature combination set table held by the allocation resource control unit 109 are different from those of the first embodiment. Hereinafter, the AICH signature combination set table which is different from that of the first embodiment is described.

The table 8 is a table showing the AICH signature combination set table according to this embodiment.

TABLE 8

| PREAMBLE SIGNATURE | AICH SIGNATURE COMBINATION | RECEPTION RESULT | E-DCH TRANSMISSION PROFILE INFORMATION NUMBER |
|---|---|---|---|
| 1 | 1, 2, 3 (0, 0, 0) | NO ACK | — |
| 1 | 1, 2, 3 (−1, 0, 0) | NACK | — |
| 1 | 1, 2, 3 (−1, −1, +1) | ACK | 1 |
| 1 | 1, 2, 3 (−1, +1, −1) | ACK | 2 |
| 1 | 1, 2, 3 (−1, +1, +1) | ACK | 3 |
| 1 | 1, 2, 3 (+1, −1, −1) | ACK | 4 |
| 1 | 1, 2, 3 (+1, −1, +1) | ACK | 5 |
| 1 | 1, 2, 3 (+1, +1, −1) | ACK | 6 |
| 1 | 1, 2, 3 (+1, +1, +1) | ACK | 7 |

In this embodiment, because the base station uses a signature combination indicating the reception result NACK that is different from a signature combination indicating the reception result ACK, it is possible to increase the total number of signature combination sets that can be used for allocation of E-DCH transmission profile information. An advantage that it is possible to reduce the blocking probability can be thereby obtained.

Fifth Embodiment

In this embodiment, the base station has a feature that it uses priorities in addition to using a signature combination indicating the reception result NACK that is different from a signature combination indicating the reception result ACK.

Hereinafter, a system in which transmission is performed by including 0 in the signature combination indicating the reception result NACK is described by way of illustration.

Although the basic configuration of this embodiment is the same as that of the third embodiment, the contents set to the AICH signature combination set table held by the allocation resource control unit 109 are different from those of the third embodiment. Hereinafter, the AICH signature combination set table which is different from that of the third embodiment is described.

The table 9 is a table showing the AICH signature combination set table according to this embodiment.

The item of the priority in the table 9 is in the case of $\Delta L1=2$ in the mathematical expression 2, just like the second embodiment.

TABLE 9

| PREAMBLE SIGNATURE | AICH SIGNATURE COMBINATION | RE-CEPTION RESULT | E-DCH TRANS-MISSION PROFILE INFOR-MATION NUMBER | PRIORITY |
|---|---|---|---|---|
| 1 | 1, 2, 3 (0, 0, 0) | NO ACK | — | — |
| 1 | 1, 2, 3 (−1, 0, 0) | NACK | — | — |
| 1 | 1, 2, 3 (−1, −1, −1) | ACK | 1 | LOW |
| 1 | 1, 2, 3 (−1, −1, +1) | ACK | 2 | LOW |
| 1 | 1, 2, 3 (−1, +1, −1) | ACK | 3 | LOW |
| 1 | 1, 2, 3 (−1, +1, +1) | ACK | 4 | LOW |
| 1 | 1, 2, 3 (+1, −1, −1) | ACK | 5 | HIGH |
| 1 | 1, 2, 3 (+1, −1, +1) | ACK | 6 | HIGH |
| 1 | 1, 2, 3 (+1, +1, −1) | ACK | 7 | HIGH |
| 1 | 1, 2, 3 (+1, +1, +1) | ACK | 8 | HIGH |

In this embodiment, because the base station assigns priorities to signatures depending on the intercode distance between signature combinations of the downlink common channel and preferentially allocates a signature combination with a high priority to the user equipment, a signature combination with a low signature error rate is frequency used, and a signature combination with a high signature error rate is less frequency used, so that an advantage that it is possible to reduce a signature error rate in the whole system can be obtained.

Further, because it is possible to increase the total number of signature combination sets that can be used for allocation of E-DCH transmission profile information, an advantage that it is possible to reduce the blocking probability can be obtained.

Although the embodiment is described on the basis of the third embodiment, it may be implemented on the basis of the second embodiment. The table 10 is a table showing the AICH signature combination set table in the case where it is on the basis of the second embodiment. The item of valid/invalid is in the case of ΔL1=2 in the mathematical expression 2, just like the second embodiment.

TABLE 10

| PREAMBLE SIGNATURE | AICH SIGNATURE COMBINATION | RE-CEPTION RESULT | E-DCH TRANS-MISSION PROFILE INFOR-MATION NUMBER | VALID/ INVALID |
|---|---|---|---|---|
| 1 | 1, 2, 3 (0, 0, 0) | NO ACK | — | — |
| 1 | 1, 2, 3 (−1, 0, 0) | NACK | — | — |
| 1 | 1, 2, 3 (−1, −1, −1) | ACK | 1 | INVALID |
| 1 | 1, 2, 3 (−1, −1, +1) | ACK | 2 | INVALID |
| 1 | 1, 2, 3 (−1, +1, −1) | ACK | 3 | INVALID |
| 1 | 1, 2, 3 (−1, +1, +1) | ACK | 4 | INVALID |
| 1 | 1, 2, 3 (+1, −1, −1) | ACK | 5 | VALID |
| 1 | 1, 2, 3 (+1, −1, +1) | ACK | 6 | VALID |
| 1 | 1, 2, 3 (+1, +1, −1) | ACK | 7 | VALID |
| 1 | 1, 2, 3 (+1, +1, +1) | ACK | 8 | VALID |

In this form, because the base station specifies information related to use or nonuse of signature combinations of the downlink common channel and sends it to the user equipment, the user equipment can limit the signature combinations to be used for a reception result from the base station. An advantage that it is possible to reduce calculation processing can be thereby obtained.

Further, an advantage that it is possible to reduce an error rate related to a reception result can be obtained.

Further, because it is possible to increase the total number of signature combination sets that can be used for allocation of E-DCH transmission profile information, an advantage that it is possible to reduce the blocking probability can be obtained.

Sixth Embodiment

In this embodiment, the base station has a feature that it uses, out of a signature combination, the signature of at least one predetermined position to indicate information containing a preamble reception result and uses the signature of a position other than the predetermined position to indicate a transmission profile information number of the uplink channel for notification to a user equipment, and uses a signature combination indicating the reception result NACK that is different from a signature combination indicating the reception result ACK.

Hereinafter, a system in which the base station uses, out of the signature combination made up of three AICH signatures, uses the first AICH signature to indicate a preamble reception result and uses the second and third AICH signatures to indicate an E-DCH transmission profile information number for notification to the user equipment, and includes 0 in a signature combination indicating the reception result NACK is described by way of illustration.

Although the basic configuration of this embodiment is the same as that of the first embodiment, the contents set to the AICH signature combination set table held by the allocation resource control unit 109 are different from those of the first embodiment. Hereinafter, the AICH signature combination set table which is different from that of the first embodiment is described.

The table 11 is a table showing the AICH signature combination set table according to this embodiment.

TABLE 11

| PREAMBLE SIGNATURE | AICH SIGNATURE COMBINATION | RE-CEPTION RESULT | E-DCH TRANS-MISSION PROFILE INFOR-MATION NUMBER |
|---|---|---|---|
| 1 | 1, 2, 3, 4 (0, 0, 0, 0) | NO ACK | — |
| 1 | 1, 2, 3, 4 (−1, 0, 0, 0) | NACK | — |
| 1 | 1, 2, 3, 4 (+1, −1, −1, −1) | ACK | 1 |
| 1 | 1, 2, 3, 4 (+1, −1, −1, +1) | ACK | 2 |
| 1 | 1, 2, 3, 4 (+1, −1, +1, −1) | ACK | 3 |
| 1 | 1, 2, 3, 4 (+1, −1, +1, +1) | ACK | 4 |
| 1 | 1, 2, 3, 4 (+1, +1, −1, −1) | ACK | 5 |
| 1 | 1, 2, 3, 4 (+1, +1, −1, +1) | ACK | 6 |
| 1 | 1, 2, 3, 4 (+1, +1, +1, −1) | ACK | 7 |
| 1 | 1, 2, 3, 4 (+1, +1, +1, +1) | ACK | 8 |

Because the base station uses, out of a signature combination, the signature of at least one predetermined position to indicate information containing a preamble reception result and uses the signature of a position other than the predetermined position to indicate a transmission profile information number of the uplink channel for notification to a user equipment, an advantage is obtained that it is possible to reduce an error rate related to a reception result compared to the case where a single signature combination is used to notify all pieces of information.

Further, because a reception result can be recognized by the signature of at least one predetermined position, an advantage is obtained that it is possible to reduce calculation processing about a reception result for which it is not necessary to determine a transmission profile information number of the uplink channel.

Further, because it is possible to increase the total number of signature combination sets that can be used for allocation of E-DCH transmission profile information, an advantage that it is possible to reduce the blocking probability can be obtained.

Seventh Embodiment

In this embodiment, the base station has a feature that it uses, out of a signature combination, the signature of at least one predetermined position to indicate information containing a preamble reception result and uses the signature of a position other than the predetermined position to indicate a transmission profile information number of the uplink channel for notification to a user equipment, uses a signature combination indicating the reception result NACK that is different from a signature combination indicating the reception result ACK, and assigns priorities to signature combinations and preferentially allocates a signature combination with a high priority to the user equipment.

Hereinafter, a system in which the base station uses, out of the signature combination made up of fourth AICH signatures, uses the first AICH signature to indicate a preamble reception result and uses the second to fourth AICH signatures to indicate an E-DCH transmission profile information number for notification to the user equipment, includes 0 in a signature combination indicating the reception result NACK, and, in the reception result ACK, sets a low use priority to a combination in which the intercode distance from an AICH signature combination whose E-DCH transmission profile information number is 1 is within a predetermined length and sets a high use priority to a combination in which it is not within the predetermined length is described by way of illustration.

Although the basic configuration of this embodiment is the same as that of the third embodiment, the contents set to the AICH signature combination set table held by the allocation resource control unit 109 are different from those of the third embodiment. Hereinafter, the AICH signature combination set table which is different from that of the third embodiment is described.

The table 12 is a table showing the AICH signature combination set table according to this embodiment.

TABLE 12

| PREAMBLE SIGNATURE | AICH SIGNATURE COMBINATION | RECEPTION RESULT | E-DCH TRANSMISSION PROFILE INFORMATION NUMBER | PRIORITY |
|---|---|---|---|---|
| 1 | 1, 2, 3, 4 (0, 0, 0, 0) | NO ACK | — | — |
| 1 | 1, 2, 3, 4 (−1, 0, 0, 0) | NACK | — | — |
| 1 | 1, 2, 3, 4 (+1, −1, −1, −1) | ACK | 1 | HIGH |
| 1 | 1, 2, 3, 4 (+1, −1, −1, +1) | ACK | 2 | LOW |
| 1 | 1, 2, 3, 4 (+1, −1, +1, −1) | ACK | 3 | LOW |
| 1 | 1, 2, 3, 4 (+1, −1, +1, +1) | ACK | 4 | HIGH |
| 1 | 1, 2, 3, 4 (+1, +1, −1, −1) | ACK | 5 | LOW |
| 1 | 1, 2, 3, 4 (+1, +1, −1, +1) | ACK | 6 | HIGH |
| 1 | 1, 2, 3, 4 (+1, +1, +1, −1) | ACK | 7 | HIGH |
| 1 | 1, 2, 3, 4 (+1, +1, +1, +1) | ACK | 8 | LOW |

Because the base station uses, out of a signature combination, the signature of at least one predetermined position to indicate information containing a preamble reception result and uses the signature of a position other than the predetermined position to indicate a transmission profile information number of the uplink channel for notification to a user equipment, an advantage is obtained that it is possible to reduce an error rate related to a reception result compared to the case where a single signature combination is used to notify all pieces of information.

Further, because a reception result can be recognized by the signature of at least one predetermined position, an advantage is obtained that it is possible to reduce calculation processing about a reception result for which it is not necessary to determine a transmission profile information number of the uplink channel.

Further, because it is possible to increase the total number of signature combination sets that can be used for allocation of E-DCH transmission profile information, an advantage that it is possible to reduce the blocking probability can be obtained.

In this embodiment, because the base station assigns priorities to signature combinations and preferentially allocates a signature combination with a high priority to a user equipment, a signature combination with a low signature error rate is frequency used, and a signature combination with a high signature error rate is less frequency used, so that an advantage that it is possible to reduce an error rate related to a reception result in the whole system can be obtained.

Although the embodiment is described on the basis of the third embodiment, it may be implemented on the basis of the second embodiment. The table 13 is a table showing the AICH signature combination set table in the case where it is on the basis of the second embodiment. The item of valid/invalid is in the case of $\Delta L1=2$ in the mathematical expression (2), just like the second embodiment.

TABLE 13

| PREAMBLE SIGNATURE | AICH SIGNATURE COMBINATION | RECEPTION RESULT | E-DCH TRANSMISSION PROFILE INFORMATION NUMBER | VALID/VALID |
|---|---|---|---|---|
| 1 | 1, 2, 3, 4 (0, 0, 0, 0) | NO ACK | — | — |
| 1 | 1, 2, 3, 4 (−1, 0, 0, 0) | NACK | — | — |
| 1 | 1, 2, 3, 4 (+1, −1, −1, −1) | ACK | 1 | VALID |
| 1 | 1, 2, 3, 4 (+1, −1, −1, +1) | ACK | 2 | INVALID |
| 1 | 1, 2, 3, 4 (+1, −1, +1, −1) | ACK | 3 | INVALID |
| 1 | 1, 2, 3, 4 (+1, −1, +1, +1) | ACK | 4 | VALID |
| 1 | 1, 2, 3, 4 (+1, +1, −1, −1) | ACK | 5 | INVALID |
| 1 | 1, 2, 3, 4 (+1, +1, −1, +1) | ACK | 6 | VALID |
| 1 | 1, 2, 3, 4 (+1, +1, +1, −1) | ACK | 7 | VALID |
| 1 | 1, 2, 3, 4 (+1, +1, +1, +1) | ACK | 8 | INVALID |

Because the base station uses, out of a signature combination, the signature of at least one predetermined position to indicate information containing a preamble reception result and uses the signature of a position other than the predetermined position to indicate a transmission profile information number of the uplink channel for notification to a user equipment, an advantage is obtained that it is possible to reduce an error rate related to a reception result compared to the case where a single signature combination is used to notify all pieces of information.

Further, because a reception result can be recognized by the signature of at least one predetermined position, an advantage is obtained that it is possible to reduce calculation processing about a reception result for which it is not necessary to determine a transmission profile information number of the uplink channel.

Furthermore, because it is possible to increase the total number of signature combination sets that can be used for allocation of E-DCH transmission profile information, an advantage that it is possible to reduce the blocking probability can be obtained.

Furthermore, because the base station specifies information related to use or nonuse of signature combinations of the downlink common channel and sends it to the user equipment, the user equipment can limit the signature combinations to be used for a reception result from the base station. An advantage that it is possible to reduce calculation processing can be thereby obtained. Further, an advantage that it is possible to reduce an error rate related to a reception result can be obtained.

Eighth Embodiment

Although the base station uses, out of a signature combination, the signature of at least one predetermined position to indicate information containing a preamble reception result and uses the signature of a position other than the predetermined position to indicate a transmission profile information number of the uplink channel for notification to a user equipment in the first embodiment, it has a feature in this embodiment that it includes information different from a preamble reception result in the signature of a plurality of predetermined positions or includes information different from a transmission profile of the uplink channel in a position other than the predetermined position.

Hereinafter, an example in which information containing a preamble reception result is constructed by a certain signature of a plurality of signatures is described. Specifically, a system in which a base station uses, out of the signature combination made up of five AICH signatures, the first and second AICH signatures to indicate predetermined AICH signatures and uses the third to fifth AICH signatures to indicate AICH signatures other than the predetermined AICH signatures for notification to the user equipment is described by way of illustration.

Although the basic configuration of this embodiment is the same as that of the first embodiment, the contents set to the AICH signature combination set table held by the allocation resource control unit 109 are different from those of the first embodiment. Hereinafter, the AICH signature combination set table which is different from that of the first embodiment is described.

The table 14 is an example of the AICH signature combination set table used in this embodiment. Predetermined signature states are constructed by the first AICH signature indicating a reception result and the second AICH signature indicating a continuous transmittable time. Signatures other than the predetermined signatures are constructed by the third and fourth AICH signatures indicating an E-DCH transmission profile information number and the fifth AICH signature indicating a transmission power offset.

TABLE 14

| PREAMBLE SIGNATURE | AICH SIGNATURE COMBINATION | RECEPTION RESULT | E-DCH TRANSMISSION PROFILE INFORMATION NUMBER | CONTINUOUS TRANSMITTABLE TIME | TRANSMISSION POWER OFFSET |
|---|---|---|---|---|---|
| 1 | 1, 2, 3, 4, 5 (0, 0, 0, 0, 0) | NO ACK | — | — | — |
| 1 | 1, 2, 3, 4, 5 (−1, 0, 0, 0, 0) | NACK | — | — | — |
| 1 | 1, 2, 3, 4, 5 (+1, +1, −1, −1, +1) | ACK | 1 | LONG | HIGH |
| 1 | 1, 2, 3, 4, 5 (+1, +1, −1, −1, −1) | ACK | 1 | LONG | LOW |
| 1 | 1, 2, 3, 4, 5 (+1, −1, −1, −1, +1) | ACK | 1 | SHORT | HIGH |
| 1 | 1, 2, 3, 4, 5 (+1, −1, −1, −1, −1) | ACK | 1 | SHORT | LOW |
| 1 | 1, 2, 3, 4, 5 (+1, +1, +1, −1, +1) | ACK | 2 | LONG | HIGH |
| 1 | 1, 2, 3, 4, 5 (+1, +1, +1, −1, −1) | ACK | 2 | LONG | LOW |

In this embodiment, the continuous transmittable time indicates "Long" when the second AICH signature state in the AICH signature combination is +1, and "Short" when it is −1. Values respectively indicated by "Long" and "Short" are preset in a user equipment. Although "Long" and "Short" are shown herein, +1 and −1 may respectively indicate specific time.

Further, the transmission power offset indicates "High" when the fifth AICH signature state in the AICH signature combination is +1, and "Low" when it is −1. Values respectively indicated by "High" and "Low" are preset in a user equipment. Although "High" and "Low" are shown herein, +1 and −1 may respectively indicate specific offset values.

Although the case where the continuous transmittable time and the transmission power offset are a two-valued figure of "Long" "Short" or "High" "Low" is described above, they are not limited to two-valued.

Although the embodiment is described on the basis of the first embodiment, it may be applied to the sixth or seventh embodiment that indicates information containing a preamble reception result by using the signature of a plurality of predetermined positions. Further, although the embodiment is described by using the AICH signature combination set table that includes information different from a preamble reception result in the signature of a plurality of predetermined positions and includes information different from a transmission profile of the uplink channel in the signature of a position other than the predetermined positions, one of including information different from a preamble reception result in the signature of a plurality of predetermined positions and including information different from a transmission profile of the uplink channel in the signature other than the predetermined positions may be implemented. Note that the continuous transmittable time is contained in the signature of a plurality of predetermined positions and the transmission power offset is contained in the signature of a position other than the predetermined positions in the table 14, information to be transmitted is not limited thereto as a matter of course.

In this embodiment, because the base station uses, out of a signature combination, the signature of a plurality of predetermined positions to indicate information containing a preamble reception result and uses the signature of a position other than the predetermined positions to indicate a transmission profile information number of the uplink channel for notification to a user equipment, an advantage is obtained that it is possible to reduce an error rate related to a reception result compared to the case where a single signature combination is used to notify all pieces of information.

Further, because a reception result can be recognized by the signature of a plurality of predetermined positions, an advantage is obtained that it is possible to reduce calculation processing about a reception result for which it is not necessary to determine a transmission profile information number of the uplink channel. Further, by including information different from a preamble reception result in the signature of a plurality of predetermined positions or including information different from a transmission profile of the uplink channel in the signature state of a position other than the predetermined positions, an advantage is obtained that it is possible to make setting of a parameter at a shorter period than making annunciation periodically. Further, the base station can control the E-DCH transmission profile with respect to each user equipment.

INDUSTRIAL APPLICABILITY

The present invention is applicable to a radio communication system in which a plurality of radio communication devices make access to a base station by using an uplink channel.

The invention claimed is:

1. A base station comprising:
a receiver configured to receive a preamble; and
a transmitter configured to transmit, on Acquisition Indicator Channel (AICH), a signal in responses to the preamble, the signal including a first indicator and a second indicator, the first indicator corresponding to a first signature, the second indicator corresponding to a second signature,
wherein the receiver is configured to receive, from a user equipment, data based on an Enhanced Dedicated Channel (E-DCH) resource in a case where the first indicator is set to −1 and the second indicator is set to −1 or +1.

2. The base station according to claim 1,
wherein the second indicator is determined based on the E-DCH resource.

3. The base station according to claim 1,
wherein the receiver is configured to receive a preamble from the user equipment in a case where the first indicator is set to −1 and the second indicator is set to 0.

4. The base station according to claim 1,
wherein the E-DCH resource corresponds to a first E-DCH resource in a case where the second indicator is set to +1, and
wherein the E-DCH resource corresponds to a second E-DCH resource in a case where the second indicator is set to −1.

5. The base station according to claim 4,
wherein the first E-DCH resource is different from the second E-DCH resource.

6. The base station according to claim 1,
wherein the transmitter is configured to transmit information related with an E-DCH resource configuration, and
wherein the E-DCH resource is determined based on the information.

7. A method comprising:
receiving a preamble;
transmitting, on Acquisition Indicator Channel (AICH), a signal in response to the preamble, the signal including a first indicator and a second indicator, the first indicator corresponding to a first signature, the second indicator corresponding to a second signature; and
receiving, from a user equipment, data based on an Enhanced Dedicated Channel (E-DCH) resource in a case where the first indicator is set to −1 and the second indicator is set to −1 or +1.

8. The method according to claim 7,
wherein the second indicator is determined based on the E-DCH resource.

9. The method according to claim 7, further comprising:
receiving a preamble from the user equipment in a case where the first indicator is set to −1 and the second indicator is set to 0.

10. The method according to claim 7,
wherein the E-DCH resource corresponds to a first E-DCH resource in a case where the second indicator is set to +1, and
wherein the E-DCH resource corresponds to a second E-DCH resource in a case where the second indicator is set to −1.

11. The method according to claim 10,
wherein the first E-DCH resource is different from the second E-DCH resource.

12. The method according to claim 7, further comprising:
transmitting information related with an E-DCH resource configuration,
wherein the E-DCH resource is determined based on the information.

13. A user equipment comprising:
a transmitter configured to transmit a preamble; and
a receiver configured to receive, on Acquisition Indicator Channel (AICH), a signal in responses to the preamble, the signal including a first indicator and a second indicator, the first indicator corresponding to a first signature, the second indicator corresponding to a second signature,
wherein the transmitter is configured to transmit, to a base station, data based on an Enhanced Dedicated Channel (E-DCH) resource in a case where the first indicator is set to −1 and the second indicator is set to −1 or +1.

14. The user equipment according to claim 13, further comprising:
a processor comprising hardware configured to:
detect negative acknowledgment (NACK) in a case where the first indicator is set to −1 and the second indicator is set to 0, and
detect the E-DCH resource based on the second indicator in a case where the first indicator is set to −1 and the second indicator is set to −1 or +1.

15. The user equipment according to claim 14,
wherein the receiver is configured to receive information related with an E-DCH resource configuration, and
wherein the processor is configured to detects the E-DCH resource based on the information and the second indicator in a case where the first indicator is set to −1 and the second indicator is set to −1 or +1.

16. The user equipment according to claim 13, wherein the transmitter is configured to perform a preamble retransmission in a case where the first indicator is set to −1 and the second indicator is set to 0.

17. The user equipment according to claim 13, wherein the E-DCH resource corresponds to a first E-DCH resource in a case where the second indicator is set to +1, and wherein the E-DCH resource corresponds to a second E-DCH resource in a case where the second indicator is set to −1.

18. The user equipment according to claim 17, wherein the first E-DCH resource is different from the second E-DCH resource.

19. A method comprising:

transmitting a preamble;

receiving, on Acquisition Indicator Channel (AICH), a signal in responses to the preamble, the signal including a first indicator and a second indicator, the first indicator corresponding to a first signature, the second indicator corresponding to a second signature; and transmitting, to a base station, data based on an Enhanced Dedicated Channel (E-DCH) resource in a case where the first indicator is set to −1 and the second indicator is set to −1 or +1.

20. The method according to claim 19, further comprising:

detecting negative acknowledgment (NACK) in a case where the first indicator is set to −1 and the second indicator is set to 0; and detecting the E-DCH resource based on the second indicator in a case where the first indicator is set to −1 and the second indicator is set to −1 or +1.

21. The method according to claim 19, further comprising:

performing a preamble retransmission in a case where the first indicator is set to −1 and the second indicator is set to 0.

22. The method according to claim 19, wherein the E-DCH resource corresponds to a first E-DCH resource in a case where the second indicator is set to +1, and wherein the E-DCH resource corresponds to a second E-DCH resource in a case where the second indicator is set to −1.

23. The method according to claim 22, wherein the first E-DCH resource is different from the second E-DCH resource.

24. The method according to claim 20, further comprising:

receiving information related with an E-DCH resource configuration; and detecting the E-DCH resource based on the information and the second indicator in a case where the first indicator is set to −1 and the second indicator is set to −1 or +1.

* * * * *